United States Patent
Russell-Clarke et al.

(10) Patent No.: US 10,532,428 B2
(45) Date of Patent: Jan. 14, 2020

(54) INTERLOCKING FLEXIBLE SEGMENTS FORMED FROM A RIGID MATERIAL

(71) Applicant: Apple Inc., Cupertino, CA (US)

(72) Inventors: Peter N. Russell-Clarke, San Francisco, CA (US); Michael S. Nashner, San Jose, CA (US)

(73) Assignee: Apple Inc., Cupertino, CA (US)

( * ) Notice: Subject to any disclaimer, the term of this patent is extended or adjusted under 35 U.S.C. 154(b) by 107 days.

(21) Appl. No.: 15/645,780

(22) Filed: Jul. 10, 2017

(65) Prior Publication Data
US 2017/0304948 A1    Oct. 26, 2017

Related U.S. Application Data

(63) Continuation of application No. 13/768,943, filed on Feb. 15, 2013, now abandoned.
(Continued)

(51) Int. Cl.
*B23K 26/38* (2014.01)
*B65D 85/00* (2006.01)
(Continued)

(52) U.S. Cl.
CPC ............. *B23K 26/38* (2013.01); *B21D 31/04* (2013.01); *B29C 53/063* (2013.01); *B65D 85/00* (2013.01);
(Continued)

(58) Field of Classification Search
CPC ...... B29C 53/063; B21D 31/04; B65D 85/00; B65D 85/30; G06F 1/1613; G06F 1/1616; G06F 1/1681; G06F 1/203; B23K 26/38
See application file for complete search history.

(56) References Cited

U.S. PATENT DOCUMENTS

| 1,675,910 A | 7/1928 | Riker |
| 2,859,510 A | 11/1958 | Baxa |

(Continued)

FOREIGN PATENT DOCUMENTS

| CN | 1836428 A | 9/2006 |
| CN | 101124054 A | 2/2008 |

(Continued)

OTHER PUBLICATIONS

Stg, "Wooden laptop for lasercutter+cnc | Projects and collaboration: general | Forum", Nov. 15, 2011, Raspberry Pi Forum, [retrieved on Dec. 7, 2018]. Retrieved from the Wayback Machine (Year: 2011).*

(Continued)

*Primary Examiner* — Dimary S Lopez Cruz
*Assistant Examiner* — Ingrid D Wright
(74) *Attorney, Agent, or Firm* — Kilpatrick Townsend & Stockton LLP

(57) ABSTRACT

A method for creating a flexible portion or bending portion within a rigid structure. The method can also be used for creating a flexible structure from a rigid material. The method includes providing a substantially rigid material, such as, but not limited to, metals, alloys, hard plastics, and the like, and selectively removing portions of the rigid material defining a geometric pattern in the rigid material. A bending radius of the flexible portion is defined by the geometric pattern. The rigid structure may be used to create an enclosure, a cover for an electronic device, one or more hinges, or the like.

19 Claims, 27 Drawing Sheets

Related U.S. Application Data

(60) Provisional application No. 61/599,766, filed on Feb. 16, 2012.

(51) Int. Cl.
*B21D 31/04* (2006.01)
*G06F 1/16* (2006.01)
*B29C 53/06* (2006.01)

(52) U.S. Cl.
CPC .......... *G06F 1/1616* (2013.01); *G06F 1/1681* (2013.01); *Y10T 428/13* (2015.01)

(56) References Cited

U.S. PATENT DOCUMENTS

| | | | |
|---|---|---|---|
| 2,909,281 A | 10/1959 | Koskinen | |
| 3,123,910 A | 3/1964 | Neilson | |
| 3,202,561 A | 8/1965 | Swanson et al. | |
| 4,038,783 A | 8/1977 | Rosenthal | |
| 4,111,029 A | 9/1978 | Dulaquais | |
| 4,164,704 A | 8/1979 | Kato et al. | |
| 4,223,480 A | 9/1980 | Welty | |
| 4,232,928 A | 11/1980 | Wickersham | |
| 4,584,799 A | 4/1986 | Juvet | |
| 4,753,918 A | 6/1988 | Cyron | |
| 4,911,796 A | 3/1990 | Reed | |
| 5,028,075 A | 7/1991 | Donnelly | |
| 5,217,335 A | 6/1993 | Houchens, Jr. et al. | |
| 5,280,819 A | 1/1994 | Newkirk et al. | |
| 5,779,218 A | 7/1998 | Kowanz | |
| 5,843,117 A | 12/1998 | Alt et al. | |
| 5,924,745 A * | 7/1999 | Campbell | E21B 17/08 285/90 |
| 5,953,989 A | 9/1999 | Uchiyama et al. | |
| 6,149,506 A | 11/2000 | Duescher | |
| 6,183,347 B1 | 2/2001 | Shaw | |
| 6,318,223 B1 * | 11/2001 | Yu | B26D 3/10 83/13 |
| 6,406,769 B1 | 6/2002 | Delabre | |
| 6,453,783 B2 | 9/2002 | Yu et al. | |
| 6,464,080 B1 | 10/2002 | Morris et al. | |
| 6,517,995 B1 | 2/2003 | Jacobson et al. | |
| 6,700,773 B1 * | 3/2004 | Adriaansen | G06F 1/1618 345/156 |
| 6,811,136 B2 | 11/2004 | Eberhardt et al. | |
| 7,122,057 B2 | 10/2006 | Beam et al. | |
| 7,171,838 B2 | 2/2007 | Shiokawa | |
| 7,274,117 B1 | 9/2007 | Viola et al. | |
| 7,540,697 B2 | 6/2009 | Wang et al. | |
| 7,582,175 B2 | 9/2009 | Trejo-Rincon | |
| 7,597,483 B2 | 10/2009 | Simmons et al. | |
| 7,685,676 B2 | 3/2010 | McClellan | |
| 7,774,918 B2 | 8/2010 | Ainsworth | |
| 8,015,852 B2 | 9/2011 | Su | |
| 8,052,743 B2 | 11/2011 | Weber et al. | |
| 8,066,251 B2 | 11/2011 | Brown | |
| 8,252,379 B2 | 8/2012 | Nagashima | |
| 8,295,902 B2 | 10/2012 | Salahieh et al. | |
| 8,439,947 B2 | 5/2013 | Howard et al. | |
| 8,454,705 B2 | 6/2013 | Pressacco et al. | |
| 8,564,961 B2 | 10/2013 | Weber | |
| 8,597,078 B2 | 12/2013 | Wilson et al. | |
| 8,601,849 B2 | 12/2013 | Luo et al. | |
| 8,994,608 B2 | 3/2015 | Russell-Clarke et al. | |
| 2004/0129651 A1 | 7/2004 | Vanhoutte et al. | |
| 2004/0266502 A1 | 12/2004 | Holtorf et al. | |
| 2005/0064345 A1 | 3/2005 | Oyake | |
| 2006/0008616 A1 | 1/2006 | Dean et al. | |
| 2006/0097127 A1 | 5/2006 | Firth | |
| 2007/0039691 A1 | 2/2007 | Mroz | |
| 2007/0199176 A1 * | 8/2007 | McClellan | E05D 1/02 16/224 |
| 2007/0256387 A1 | 11/2007 | Dorsy | |
| 2008/0206509 A1 | 8/2008 | Kent et al. | |
| 2008/0257006 A1 | 10/2008 | Durney et al. | |
| 2008/0312727 A1 | 12/2008 | Blank | |
| 2009/0014118 A1 | 1/2009 | Ratcliffe | |
| 2009/0043228 A1 | 2/2009 | Northrop et al. | |
| 2009/0049615 A1 | 2/2009 | Poppe | |
| 2010/0012260 A1 | 1/2010 | Brennan et al. | |
| 2011/0041553 A1 | 2/2011 | Xiong et al. | |
| 2011/0156361 A1 | 6/2011 | Ghalambor et al. | |
| 2013/0251934 A1 | 9/2013 | Caracciolo et al. | |
| 2013/0291367 A1 | 11/2013 | Nashner et al. | |
| 2013/0318766 A1 | 12/2013 | Kiple et al. | |
| 2014/0076731 A1 | 3/2014 | Russell-Clarke et al. | |
| 2014/0082926 A1 | 3/2014 | Tam et al. | |
| 2014/0102162 A1 | 4/2014 | Morgenstern et al. | |
| 2015/0273524 A1 | 10/2015 | Ely et al. | |
| 2015/0289395 A1 | 10/2015 | Van Asseldonk et al. | |
| 2016/0089811 A1 | 3/2016 | Matsuyuki et al. | |
| 2016/0090326 A1 | 3/2016 | Matsuyuki et al. | |
| 2016/0366997 A1 * | 12/2016 | Sirichai | A45C 11/00 |

FOREIGN PATENT DOCUMENTS

| | | |
|---|---|---|
| CN | 201248054 | 5/2009 |
| CN | 201940834 U | 8/2011 |
| CN | 102316179 A | 1/2012 |
| CN | 202872871 U | 4/2013 |
| CN | 103873619 A | 6/2014 |
| CN | 103951420 A | 7/2014 |
| JP | 60-244493 | 12/1985 |
| JP | 2000-061745 A | 2/2000 |
| KR | 10-2008-0103031 A | 11/2008 |
| WO | 03/002289 | 1/2003 |
| WO | 2012/007755 A3 | 9/2012 |
| WO | 2013/093822 A1 | 6/2013 |

OTHER PUBLICATIONS

Fenner, "Laser-cut Lattice Living Hinges", Dec. 16, 2011, DefProc Engineering, [retrieved on Dec. 7, 2018]. Retrieved from URL (Year: 2011).*

Large picture of Wooden Laptop for lasercutter +cnc (Year 2011) (Year: 2011).*

Author Unknown, "Laboratory Instruments," http://www.mocon.com, 2 pages, at least as early as Oct. 12, 2012.

Author Unknown, "Stewmac Inlay Tools and Materials," http://web.archirve.org/ . . . op/Inlay_pearl/Tools_and_supplies_for:_Inlay,_pearl_cutting/Carbide_Downcut_Inlay_Router_Bits.html, 5 pages, at least as early as Dec. 4, 2013.

Bril, Laser Perforation: The Diffractive Beamsplitter Advantage, Jan. 3, 2007, HOLO/OR LTO., date stamp, title and two paragraphs (1 page).

Industrial Perforators Association, Designers, Specifiers And Buyers Handbook For Perforated Metals, 1993, Industrial Perforators Association, Title, copyright, 2 pages of text and images.

International Search Report, PCT Application No. PCT/US2013/026384, 3 pages, dated May 28, 2013.

McNichols, Quality Perforated Products, Jun. 17, 2005, McNichols, Date stamp and 11 pages of text and images.

* cited by examiner

INTERLOCKING FLEXIBLE SEGMENTS FORMED FROM A RIGID MATERIAL

CROSS REFERENCE TO RELATED APPLICATIONS

This application is a continuation of U.S. patent application Ser. No. 13/768,943, filed Feb. 15, 2013, which claims priority to U.S. provisional application No. 61/599,766, filed Feb. 16, 2012. The disclosure of each earlier application is hereby incorporated herein by reference in its entirety.

TECHNICAL FIELD

The present invention relates generally to creating flexible portions within a rigid material and more specifically, to creating flexible segments for components of electronic devices.

BACKGROUND

Many electronic devices, peripheral components or devices (such as speakers, headphones, keyboards, etc.) may include housings or enclosures made of a relatively rigid material, such as plastic or metal. These types of enclosures are typically at least somewhat rigid in order to provide protection for internal components housed within the enclosures. However, due to the rigidity of the material, in order for these type of enclosures or housings to bend or flex, a separate element, such as a hinge, may need to be connected to the rigid material. For example, laptop enclosures may include two separate rigid components interconnected together by one or more hinges that allow the two components to move relative to each other. These additional components, such as hinges, may increase the size of the enclosures and thus the size of the electronic devices or peripheral devices, as well as increase manufacturing costs as additional components may need to be assembled together.

SUMMARY

Examples of embodiments described herein may take the form of a method for creating an enclosure for an electronic device. The method includes providing a rigid material and removing sections of the rigid material to create a geometric pattern of interlocking features. The geometric pattern may define the flex of the rigid material.

Other embodiments may take the form of an enclosure formed of a substantially rigid material. The enclosure may include a first plurality of flex apertures defined within the rigid material along a first row and a second plurality of flex apertures defined within the rigid material along a second row. The second row is positioned below the first row and the first plurality of flex apertures are misaligned with the second plurality of flex apertures such that a first end of each of the first plurality of flex apertures is in a different vertical plane from a first end of each of the second plurality of flex apertures. When a bending force is applied to one of the first row or the second row, the first plurality of flex apertures and the second plurality of flex apertures vary in shape or dimension, allowing the rigid material to bend.

Yet other embodiments of the disclosure may take the form of a housing formed of a substantially rigid material. The housing may include a first plurality of interlocking features defined within the rigid material, a second plurality of interlocking features defined within the rigid material, and a plurality of flex apertures defined between the first plurality of interlocking features and the second plurality of interlocking features to separate the first plurality of interlocking features from the second plurality of interlocking features. The first plurality of interlocking features is movable relative to the second plurality of interlocking features.

Other embodiments of the disclosure may take the form of a method of manufacturing a flexible component. The method includes providing a substantially rigid material and removing portions of the rigid material to create a plurality of flex apertures. The flex apertures are defined by interlocking features of the rigid material, the interlocking features are adjacent to each other and spaced apart from one another by the flex apertures. Each one of the interlocking features has at least one sidewall and an angle of the sidewall determines a radial bend the rigid material. The rigid material formed using the disclosed method may be non-cylindrical, e.g., planar or a three-dimensional object that includes curves but is not substantially cylindrical.

DETAILED DESCRIPTION

Figure 1:
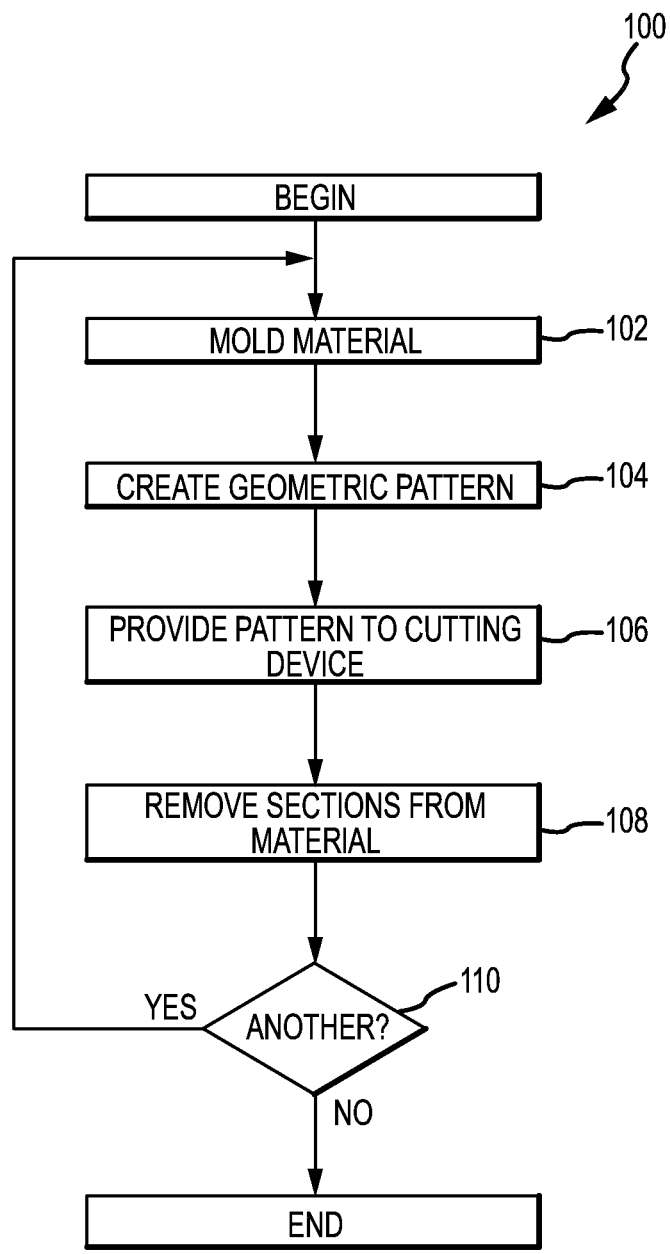
FIG. 1 is a flow chart illustrating a method for creating a flexible portion within a rigid material.

Some embodiments described herein may take the form of a method for creating a flexible portion or element within a rigid or substantially rigid material. It should be noted that the term rigid material as used herein is meant to encompass rigid materials, semi-rigid (partially flexible materials), and substantially any materials where an increased flexibility may be desired. For example, the rigid material may be metal, carbon fiber, composites, ceramics, glass, sapphire, plastic, or the like. The flexible portion or portions defined in the rigid material may function as a living hinge or mechanical hinge and allow the rigid material to bend to a predetermined angle in a predetermined direction. In some embodiments, the flexible portion may be positioned at substantially any location of the rigid material and may span across one or more dimensions of the rigid material (e.g., across a width, length, or height of the rigid material). In some instances, the rigid material may be substantially flat or planar, may represent a three-dimensional object (e.g., a molded or machined component), or the like.

The flexible portion may be defined by a geometric pattern that may be recessed and/or cut into the rigid material. In some embodiments, the geometric pattern may define one more movable elements that are interlocked together. The movable elements or interlocking features may move relative to adjacent elements, but may be prevented from disconnecting from those adjacent elements. The flexible portion may include a plurality of movable interlocked elements, each of which may move a predetermined amount, so that the combination of the plurality of movable elements creates a bend point or area for the rigid material or device or enclosure made from the material. The amount of bending, that is, the maximum angle through which the rigid material can deform if all movable interlocked elements translate to their maximums, may be varied by changing either the degree of movement between individual interlocked movable elements or the shape of one or more elements. Similarly, the bend angle, direction, pitch, and bend or flexing axis may vary with the geometric pattern of the cuts. For example, a first geometric pattern may allow the rigid material to only bend along a single axis where as a second geometric pattern may allow the rigid material to bend along multiple axes. As another example, by varying the angulation of the shape of the elements, the flexing radius may be modified.

The rigid material may include one or more different patterns, angles, or the like. In other words, the rigid material may have some sections that are more flexible than others, which may be done by modifying the geometric pattern, the angulation of the pattern, or the like.

In some embodiments, the method for creating the flexible portion may be used to create enclosures for electronic devices, including portable and/or peripheral devices. For example, an enclosure for a laptop may be created from a rigid material having a flexible portion defined around approximately a midpoint of the material. The flexible portion may allow the rigid material to be folded in half and thus acts as a laptop clamshell. A top portion may support a display screen and a bottom portion may support a keyboard, track pad, and the like, while an interior defined by sidewalls of the rigid material may house a variety of electronic components in accordance with conventional laptop computing devices. In this manner, the enclosure (or a portion thereof) may be created from a single rigid material, while still providing flexibility and bending for the enclosure. As another example, the method may be used to create a flexible cover for an electronic device, such as a cover for a tablet computer or smart phone.

As another example, the method may be used to create a housing or a portion of a housing for headphones. In this example, the flexible segments may cooperate to form an enclosure encompassing, and protecting, a wire where it enters the enclosure of the headphone. The enclosure at the connection location to the wire or cable may flex around one or more axes to provide bending in multiple directions. This flexibility may substantially prevent the enclosure from cracking as the wire moves relative to the earpieces because the connection portion of the earpiece may move, at least in part, with the movement of the communication wire. Additionally, the flexibility may also help to prevent internal wires of the cable from breaking as the flexibility of the housing may increase the radius that the cable or wire may bend, thus providing strain relief to the internal wires as it is bent.

Yet other examples include using the method to create bands, straps, or cables having flexible sections or that may be substantially flexible. As a specific example, the method may be used to create a band that may support an electronic device, such as an arm band for holding a portable electronic device on a user's bicep. As another specific example, the method may also be used to create strain relief sections for cables, straps, or the like. The method may further be used to create handles, cases, bags, purses, or the like.

Turning now to the figures, a method for creating a flexible portion in a rigid material will be discussed in more detail. FIG. 1 is a flow chart for a method 100 for creating a flexible portion within a rigid material. The method 100 may begin with operation 102 and the rigid material may be formed or otherwise provided. In some embodiments, the rigid material may be metal injection molded into a desired shape, the shape of the rigid material may be milled or otherwise cut from a block or sheet of material, or other manufacturing techniques may be used. The rigid material may be substantially any material where an increased flexibility is desired. For example the material may include metals, metal alloys, plastics, composite materials (e.g., carbon fiber reinforced plastic, magnetic or conductive materials, glass fiber reinforced materials, or the like), ceramics, sapphire, glasses, printed circuit boards, and the like. Additionally, the rigid material may include a combination of two or more materials connected together (e.g., through adhesive, welding, or the like). As one example, in instances where a first material may be brittle (e.g., glass), the material may be laminated or otherwise connected to another less brittle material and then the combined material may be modified using the method 100.

The formation process used in operation 102 to create the rigid material may be varied depending on the type of material used and/or the size/dimensions of the desired shape. For example, in instances where the material is a hard plastic, injection molding may be used to create the material. However, injection molding may not be desired for other types of materials. Additionally, operation 102 may be optional. For example, in some instances, the rigid material may be provided from another source (e.g., manufacturer) and then may be manipulated, as discussed in more detail below, to provide the flexible portion. Accordingly, in some instances, the rigid material may be in the form of a three-dimensional shape, such as the formed shape of a molded or milled component. Also, it should be noted that the thickness of the rigid material may vary as desired based on the use of the material or shape of the component.

Figure 3A:
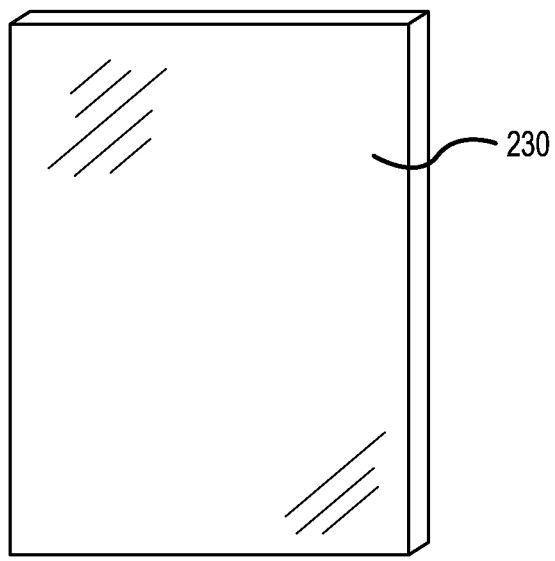
FIG. 3A is a top perspective view of the rigid material forming the enclosure prior to being formed with the flexible portion.

The shape of the rigid material after operation 102 may not be the final shape of the component as some features such as a small or complex apertures, or finishes such as rounded edges, coatings, painting, and the like may be completed after the method 100 has completed. In other embodiments, such as those where the rigid material may be injection molded, the shape of the rigid material after operation 102 may be substantially the same as the final shape of the rigid material (excluding the changes in shape due to operation 108 discussed in more detail below). FIG. 3A illustrates a top plan view of the rigid material after operation 102, and is discussed in more detail below. Alternatively or additionally, the rigid material may include one or finishes, coatings, decorations, or the like, prior to being manipulated during the method 100. For example, the rigid material may be painted, anodized, layered with one or more coatings, films, or the like, may be applied to the material prior to operations 104 and 106 (discussed below).

After operation 102 and the shape of the rigid material is created, the method 100 may proceed to operation 104 and a geometric pattern may be determined. In operation 104, the desired bending direction or axis, bending angle or degree, size of apertures within the material, and/or spring rate for the flexible portion may be analyzed to determine the desired geometric pattern. The geometric pattern may be created by a processor executing one more algorithms or may be determined by a user. The pattern may take into account a number of desired characteristics for the flexibility of the rigid material. For example, increasing the angle of the cuts in the geometric pattern may increase the bending radius of the material. As another example, decreasing the width of the cuts or the removed material may reduce the bending radius. In addition to the bending characteristics listed above, there may be additional characteristics of the geometric pattern, such as an aesthetic appearance of the pattern, type of material to be used, and so on that may also be taken into account. Different examples of geometric patterns having one or more of the above listed characteristics are discussed in more detail below with respect to FIGS. 4A, 5A, 6A, and 7A.

The geometric pattern chosen may include one or more patterns. For example, a first section of the material may be selected to have a first geometric pattern with a first bend radius whereas a second section of the material may be selected to have a second geometric pattern with a second bend radius. In this manner, the two sections of the material (when finished) may have different bend flexibilities. As another example, a first side of the material may include a first geometric pattern and a second side of the material may include a second geometric pattern. In other words, the front side pattern may not match the backside pattern. In this manner, the material may have a first bend radius when bent in a first direction (e.g., the front rolled upon itself) and a second bend radius when bent in a second direction (e.g., the back side rolled upon itself).

Once the geometric pattern has been determined, the method 100 may proceed to operation 106 and the pattern may be provided to a cutting mechanism or device. In some embodiments, the geometric pattern may include sharp corners and/or small apertures. In these embodiments, the cutting device may be a laser cutting machine, which may use a laser to cut or engrave the geometric pattern into the rigid material. In other embodiments, the cutting device may be an electrical discharge machine, which may use a wire or probe to remove material in the shape of the geometric pattern. In either of these embodiments, the geometric pattern may be provided to the cutting device in the form of data. For example, the geometric pattern may be provided to the cutting device by communicating data, such as in the form engineering drawings, computer aided design (CAD) files, computer aided manufacturing (CAM) files, or computer numerical control (CNC) files, to a processor or other component within the cutting device.

After operation 106, the method 100 may proceed to operation 108 and the geometric pattern may be incorporated into the rigid material. In some embodiments, the cutting device may remove sections or portions of the rigid material to form the geometric pattern. For example, in instances where the cutting device is a laser, a laser beam may cut apertures into the rigid material or remove one or more layers of the rigid material to create a recess within the rigid material. The laser beam may melt, cut, burn, and/or vaporize the material to create the apertures and/or recesses (engraved portions) within the rigid material. In embodiments utilizing a laser as the cutting mechanism, the laser may include a multi-axis head that can shift as appropriate to create the angulation and other requirements of the geometric pattern or patterns. For example, the position of the head of the laser may be modified based on the shape of the cuts, while maintaining a single cut through a portion of the material.

In other embodiments, for example, where the cutting device is a water jet or other pressurized cutter, the material may be removed by a pressurized stream water which may optionally include one or more abrasive materials to assist in removing the rigid material. Other cutting devices are also envisioned, but may depend on the complexity of the geometric pattern and/or the type of material for the rigid material. For example, electrical discharge machining (EDM) may be used and a wire or probe may be used to remove material in the shape of the geometric pattern.

It should be noted that certain portions of the geometric pattern may have apertures defined through the rigid material, whereas other portions of the geometric pattern may include recesses defined only through one or two layers of the rigid material (that is, they do not pierce through the rigid material).

After operation 108 in which the geometric pattern has been engraved and/or cut into the rigid material, the method 100 may proceed to operation 110. In operation 110, a computer and/or a user may determine whether another component should be manufactured. If another component is to be manufactured, the method 100 may return to operation 102. However, if another component is not going to be manufactured, the method 100 may terminate at an end state.

Alternatively, in instances where the material and/or the component may not be finalized or otherwise requires additional processing, the method may include an additional operation of finalizing or finishing the material. For example, one or more coatings, paints, decorations, or finishes may be applied to the material after it has been cut. In instances where finishes may be applied after the material has been cut with the geometric pattern, the coatings may be applied to extend around the sidewalls of the material formed by the cuts. However, as discussed above, in some embodiments, the material or component may be substantially finalized or otherwise may include the desired finishes prior to being cut. In these instances, the material may not need to be further processed. Moreover, it should be noted that the flexible sections may be created in a rigid material that is mounted within another component or fixture.

The method 100 may also be used to create components having one or more flexible portions or components that are entirely flexible. In some embodiments, sheets or large portions of a rigid material may be cut using the method 100, and once cut with a geometric pattern, one or more shapes or smaller components may be cut therefrom. For example, a large sheet of a rigid material may be cut with a geometric pattern along its entire length and then a plurality of smaller pieces of the material may be cut or stamped from the large sheet. In this example, the smaller pieces may be entirely flexible along their entire length, width, or other dimension. As another example, the rigid material that is cut using the method 100 may include one or more extrusions, apertures, or the like. As a specific example, a hole or aperture may be cut into a center of the rigid material (before or after the rigid material is processed using the method 100) and the geometric pattern may extend around the aperture. In this example, the edges of the aperture may flex due to the geometric pattern, allowing the material surrounding the aperture to remain flexible.

The method 100 and the geometric patterns discussed in more detail below may be used to create interlocking segments for a material, where the material shape may not be cylindrical. The geometric patterns, such as those patterns utilizing angled sidewalls or angulation, may allow sheets and other non cylindrical items to be cut and remained remain connected together. In other words, rather than relying solely on the shape of the object itself to maintain the connection of the components of the geometric pattern, the geometric pattern, rather than the shape of the object, may be used to allow the object to remain interconnected, despite the apertures defined through the object. Thus, the method 100 may be used to create components and materials for a number of different apparatuses and items.

Figure 2A:
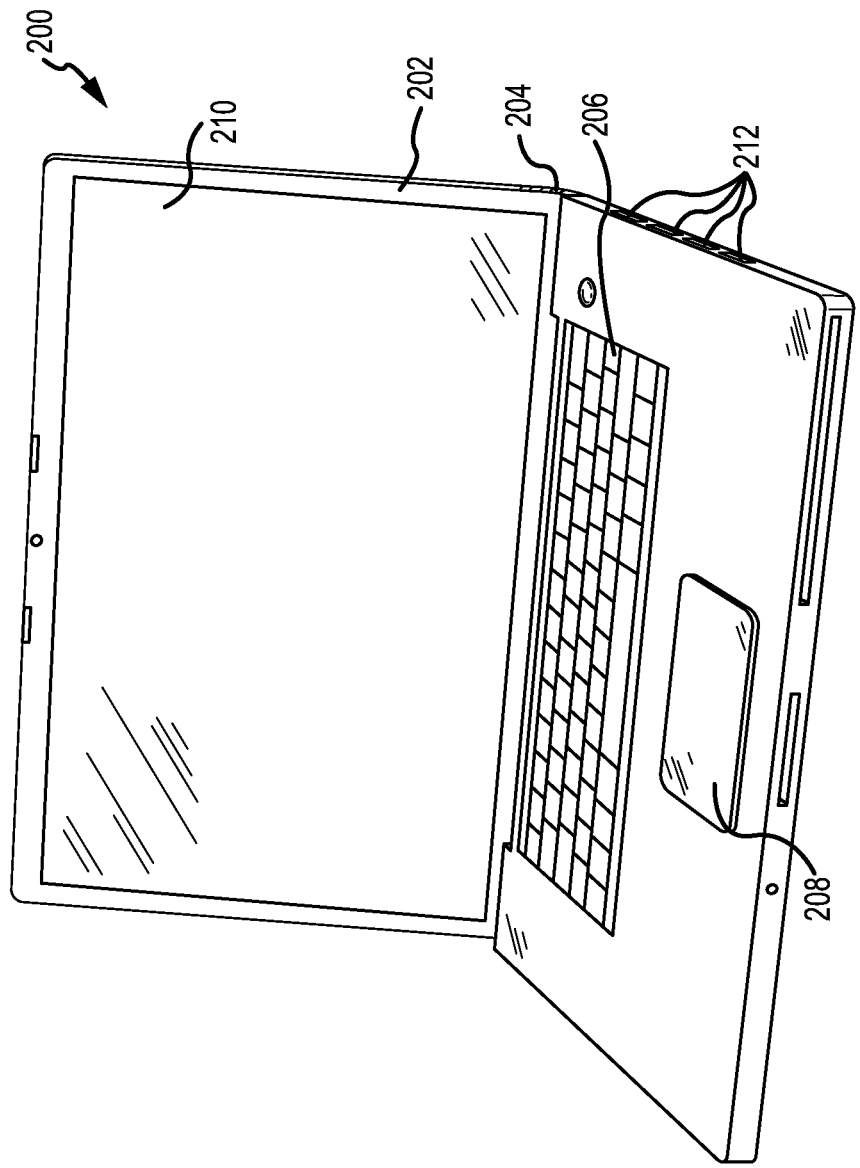
FIG. 2A is a front perspective view of an electronic device including an enclosure formed of a rigid material including a flexible portion.

Illustrative enclosures formed using the method 100 of FIG. 1 will now be discussed. FIG. 2A is a perspective view of an electronic device 200 including an enclosure 202 formed of a substantially rigid material 230 including a strain relief or flexible portion 204. The enclosure 202 may at least partially surround one or more components of the electronic device 200, such as a keyboard 206, track pad 208, and/or a display 210. Further, although not shown, the enclosure 202 may house one or more internal components (also not shown) of the electronic device 200, such as a processor, storage medium, and so on. It should be noted that, although the electronic device 200 in FIG. 2A is illustrated as a computer, other electronic devices are envisioned. For example, the enclosure 202 may be used for smart phones, digital music players, display screens or televisions, video game consoles, set top boxes, telephones, and so on. The method 100 may also be used to create enclosures (or portions thereof) for one more peripheral devices such as keyboards, mice, connection cables or cords, earphones, and so on. Further, the method 100 may be used to create bands (such as an arm band to support an electronic device), garage doors, straps, handles, cases, bags, covers for electronic devices such as tablet computers or electronic reading devices, shades or blinds, and substantially any other components which may require flexibility.

The enclosure 202 may also include one or more connection apertures 212 defined therein. The connection apertures 212 may be defined during the method 100, or in another manner (e.g., while the rigid material is being formed). The connection apertures 212 may receive one or more cables, such as communication, data, and/or power cables, to provide a connection port for the those cables to the electronic device 200. For example, the connection apertures 212 may define an input/output port for universal serial bus (USB) cable, a power cable, or a tip ring sleeve connector. The position, size, number, and/or shape of the connection apertures may be varied depending on the desired connectivity for the electronic device 200.

Figure 2B:
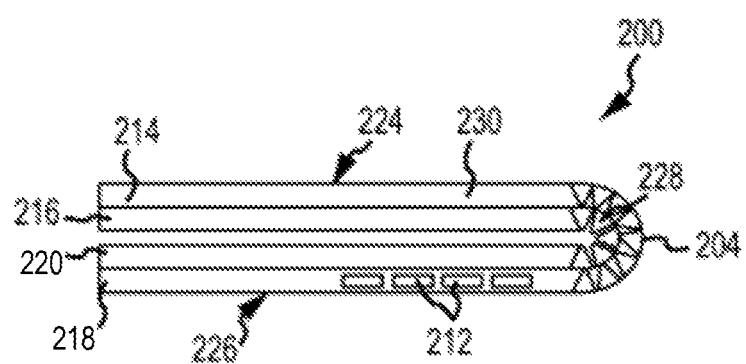
FIG. 2B is a side elevation view of the electronic device including a first embodiment of the enclosure.

The flexible portion 204 of the enclosure 202 may allow the enclosure 202 (specifically, the rigid material 230) to bend in at least one direction. FIG. 2B is a side elevation view of the electronic device 200 in a closed position, with the enclosure 202 folded at the flexible portion 204. The enclosure 202 may bend so that a top 224 of the enclosure 202 may be folded onto or positioned adjacent to a bottom 226 of the enclosure 202. In other words, the top 224 may be rotated from a perpendicular, obtuse, or other angular orientation with respect to the bottom 226 (see FIG. 2A) to a substantially parallel orientation with the respect to the bottom 226. For example, in instances where the electronic device 200 is a laptop computer, the display 210 may be operably connected to the top 224 and may be rotated downwards towards the bottom 226, closing the electronic device 200. In this manner, the enclosure 202 may function as a clamshell in that it may selectively rotate around an axis to position the top 224 relative to the bottom 226. It should be noted that in other embodiments, both the top and bottom 224, 226 may rotate relative to each other or only one of the top or bottom 224, 226 may rotate. The flexible portion 204 and the rotation of the top 224 and bottom 226 will be discussed in more detail below.

With reference to FIGS. 2A and 2B, the top 224 and bottom 226 may include one more portions operably connected together. The top 224 may include a first or outer portion 214 and a second or inner portion 216 operably connected to define a cavity within the top 224. Similarly, the bottom 226 may include a first or outer portion 218 and a second or inner portion 220 that may be operably connected together to define a cavity within the bottom 226. The cavities (not shown) may receive the one or more internal components of the electronic device 200, as well as may at least partially receive the display 210, the keyboard 206, and/or the track pad 208.

In some embodiments, the outer portion 214, 218 may have substantially the same depth as the respective inner portion 216, 220. In other words, the outer portion 214 may have a depth that may be approximately half the depth of the cavity and the second portion 216 may have a depth that may have approximately half of the depth of the cavity. In these embodiments, the outer portions 214, 218 may be formed of a single rigid material 230 and the inner portions 216, 220 may be formed of a separate rigid material that may be operably connected to the outer portions 214, 218.

With reference to FIG. 2B, in embodiments where the top 224 and bottom 226 include two or more portions 214, 216, 218, 220, the outer portions 214, 218 may include the flexible portion 204 and the inner portions 216, 220 may include an inner or second flexible portion 228. The inner flexible portion 228 may be substantially the same as the outer flexible portion 204, so that the inner portions 216, 220 may have approximately the same bend angle and movement range as the outer portions 214, 218. The second inner flexible portion 228 defined on the inner portions 216, 220 may be substantially similar to the flexible portion 204.

Figure 2C:
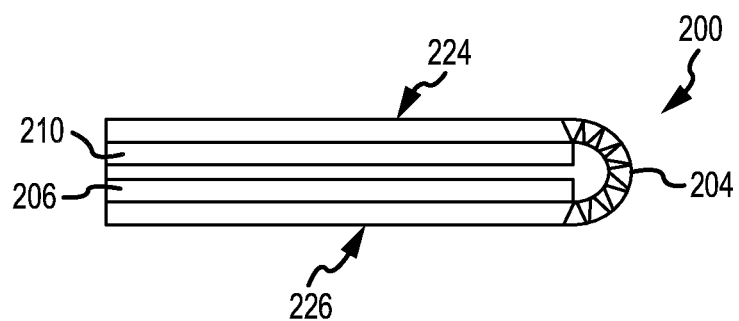
FIG. 2C is a side elevation view of the electronic device including a second embodiment of the enclosure.

In other embodiments, the inner portions 216, 220 may be panels or plates, or may have otherwise have a reduced depth compared to the depth of the outer portions 214, 218. In yet other embodiments, the top 224 and bottom 226 may include a single portion, and the cavity may be created by removing material through one or more apertures within the top 224 and/or bottom 226. FIG. 2C is a side elevation view of the top 224 and bottom 226 formed of a single rigid material 230. For example, the top 224 may be at least partially hollowed out to define a surface and four sidewalls extending therefrom, and the display 210 may be operably connected to the surface and sidewalls to enclose the surface. Similarly, the bottom 226 may be formed to receive the keyboard 206, which may form the cover portion for the bottom 226 cavity to cover the internal components. The construction of the enclosure 202 may be varied depending on the desired size, dimensions, and/or electronic device 200 be housed by the enclosure 202.

In embodiments where either the outer portions 214, 218 and/or the inner portions 216, 220 may from a panel or cover, the respective portions may terminate prior to the flexible portion 204 and thus the flexible portion 204 may form the entire hinge for the top 224 and bottom 226. Similarly, in embodiments where the top 224 and bottom 226 are formed of a single portion as shown in FIG. 2C, the flexible portion 204 may form the only hinge for the enclosure 202. In these embodiments, a single material portion may form the entire enclosure 202. That is, the enclosure 202 may be substantially unibody in that it may be formed form a single piece of material. However, due to the flexible portion 204, discussed in more detail below, the enclosure 202 may bend in order to fold the top 224 towards the bottom 226 or vice versa. Briefly, the flexible portion 204 includes a geometric pattern including interconnected elements that may move or change shape relative to each other in order to provide a flexibility to the rigid material 230 forming the enclosure 202.

FIG. 3A is a top perspective view of an at least partially rigid material 230 prior to being formed with the flexible portion 204. The rigid material 230 may form one of the outer portions 214, 218 and/or one of the inner portions 216, 220 (see FIG. 2B). In other embodiments, the rigid material 230 may form both the top 224 and bottom 226 when formed of a single portion (see FIG. 2C).

Figure 3B:
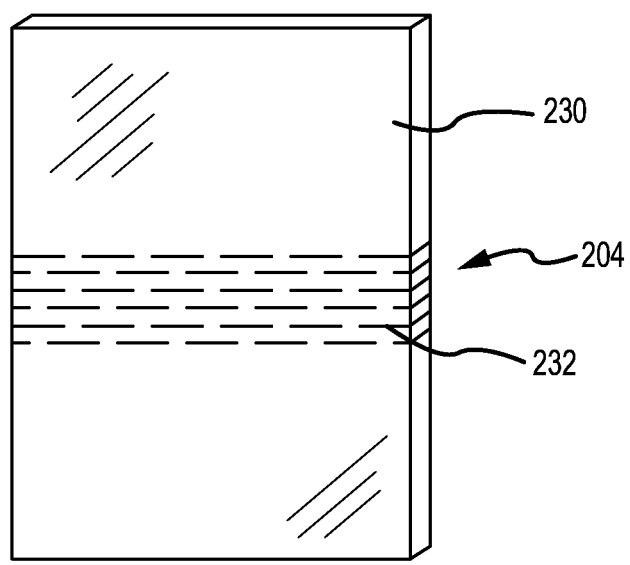
FIG. 3B is a top plan view of the rigid material including a first embodiment of a geometric portion forming the flexible portion.
Figure 4A:
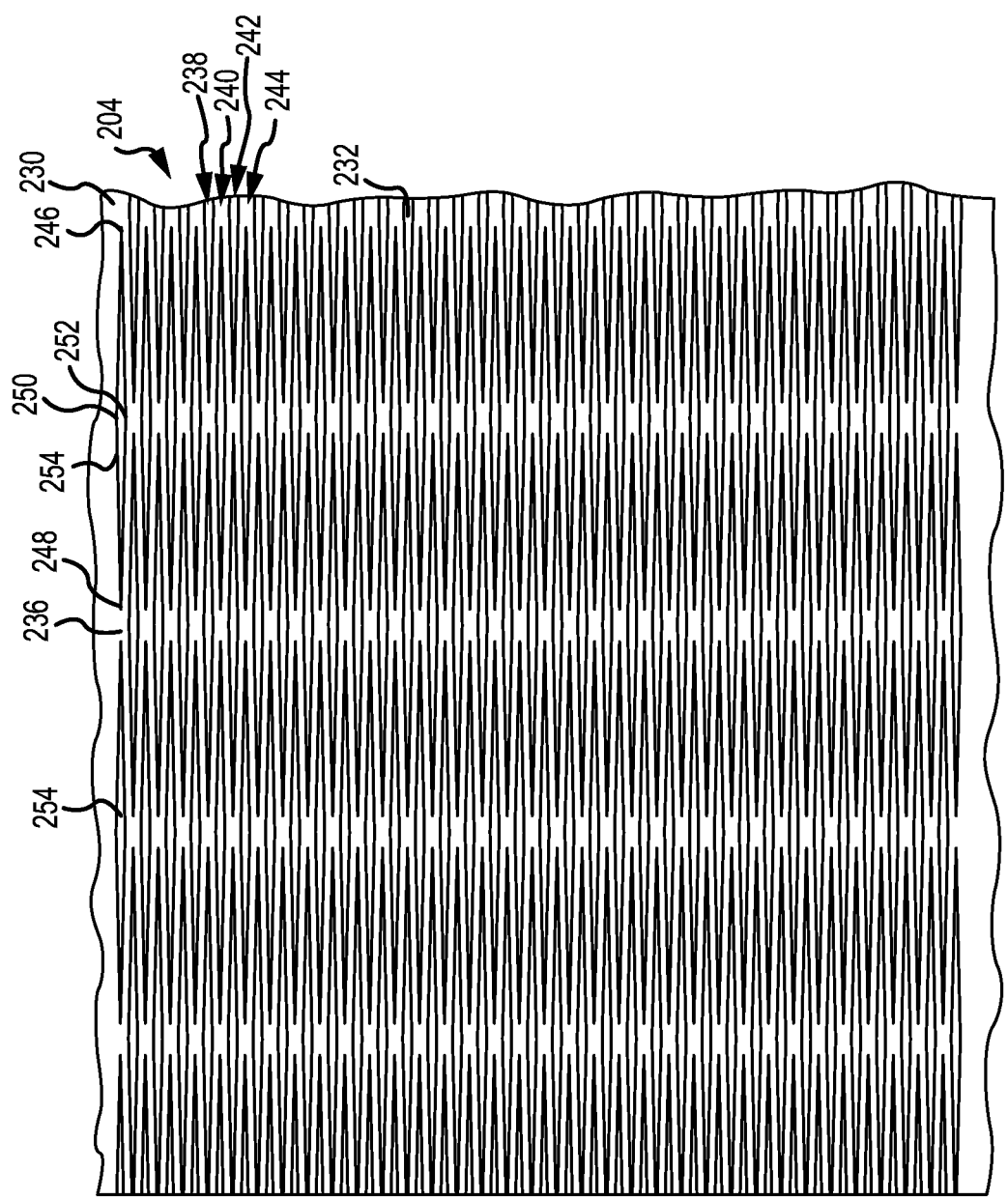
FIG. 4A is an enlarged view of the geometric pattern of FIG. 3B during bending.

As described above, with respect to FIG. 1, the method 100 may be used to create the flexible portion 204 within the rigid material 230 by defining a geometric pattern into the rigid material 230. FIG. 3B is a top plan view of the rigid material 230 including a geometric pattern 232. FIG. 4A is an enlarged top plan view of the rigid material 230 with a geometric pattern 232 formed therein to define the flexible portion 204. The geometric pattern 232 may be varied depending on the desired bend angle, position, spring rate, and the like. In one embodiment, as shown in FIG. 4A, the geometric pattern 232 may be a series of interconnected flex apertures 234 positioned apart from one another to define spacing sections or interlocking features 236. There may be one or more rows 238, 240 of flex apertures 234 that may be misaligned from one another. For example, a first row 238 may include flex apertures 234 offset from flex apertures 234 within a second row 240 positioned directly below the first row 238. In this manner, the flex apertures 234 of adjacent rows 238, 240 may begin and terminate at varying locations from one another.

The flex apertures 234, as discussed in more detail below, may be generally linearly shaped apertures formed within the rigid material 230. In some instances, the flex apertures 234 may have a diameter or width that may be selected so that before the rigid material 230 is flexed or bent, the flex apertures 234 may not be substantially visible, improving the aesthetic appearance of the rigid material 230. In other words, prior to bending, the flexible portion 204 may not substantially stand out in appearance from the other surfaces of the rigid material 230.

During the method 100, the flex apertures 234 may be formed so that the sidewalls surrounding each aperture 234 may have different angular orientations throughout the thickness of the material 230. That is, the flex apertures 234 may have different dimensions through the thickness of the material 230, as the sidewalls 254 may vary in angular orientation (width). The varying dimensions of the flex apertures 234 may allow the rigid material 230 forming the sidewalls 254 to be able to bend or fold, while still maintaining structural strength.

With reference to FIG. 4A, the combination of the first row 238 and the second row 240 may be repeated throughout a length of the flexible section 204. For example, a third row 242 may include flex apertures 234 that may be substantially aligned with the flex apertures 234 of the first row 238. Similarly, a fourth row 244 may include flex apertures 234 that may be substantially aligned with the flex apertures 234 of the second row 240. In these embodiments, the flex apertures 234 may be considered to be aligned if a first end 246 of the flex aperture 234 is positioned in a same vertical plane as the first end 246 of another flex aperture 234 and a second end 248 may be positioned in a same vertical plane as the second end 248 of another flex aperture 234 in another row.

The shape and/or dimensions of the flex apertures 234 may be varied depending on the desired flexibility of the rigid material 230. For example, the larger the flex apertures 234, the larger the flexibility of the rigid material 230; however, the increase in size of the flex apertures 234 may lead to a corresponding reduction in rigidity and/or strength for the rigid material. Accordingly, the size of the flex apertures 234 may be balanced against a desired level of rigidity required to best protect the internal components of the electronic device 202 200 from damage.

Figure 4B:
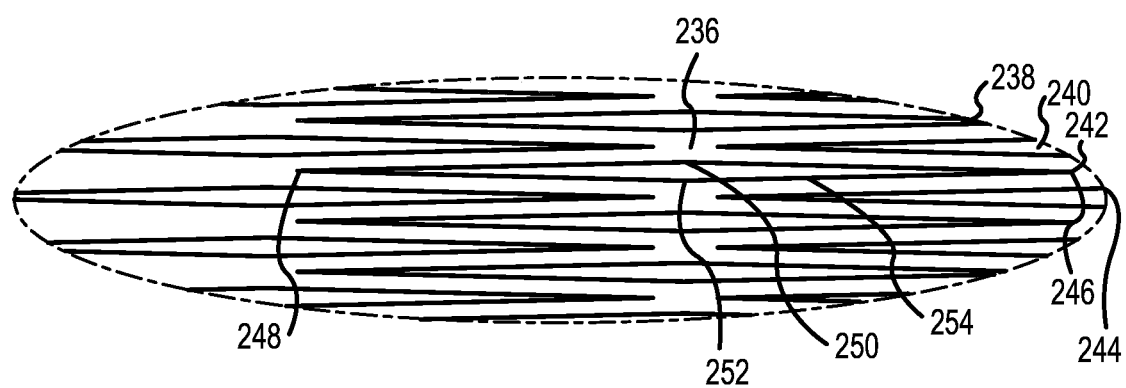
FIG. 4B is a further enlarged view of the geometric pattern of FIG. 3B during bending.

FIG. 4B is an enlarged view of a portion of the geometric pattern 232 during bending. With reference to FIGS. 4A and 4B, in some embodiments, as the rigid material 230 bends along the flexible portion 204 the flex apertures 234 may deform or stretch to be generally diamond shaped as rigid material 230 is stretched. Specifically, in some embodiments, the flex apertures 234 may be generally linearly shaped when formed and during bending may stretch for form a diamond shape in order to accommodate the bending force without breaking the material 230. For example, from the first end 246, the aperture may expand in a triangularly shaped manner, to form two apexes 250, 252, a top apex 250 and a bottom apex 250, 252. The two apexes 250, 252 may be aligned with one another, such that the top apex 250 may be positioned over the bottom apex 252. From the two apexes 250, 252 the aperture 234 may descend downwards towards the second end 248. The second end 248 may be substantially laterally aligned with the first end 246. As the bending force is applied to the rigid material 230, the top surface of the flex aperture 234 and the bottom surface may expand away from each other to define the apexes 250, 252. As the bending force increases, the apexes 250, 252 may expand farther away from one another.

In other embodiments, the flex apertures 234 may be diamond shaped when formed, and thus the diamond may be expanded rather than the portions of a linear line expanding into a diamond shape due to the bending force.

It should be noted that in some embodiments after bending, the rigid material 230 may experience some plastic deformation in that the shape of the flex apertures 234 may be somewhat deformed and remain in the diamond shape, rather than the linear shape as originally formed. However, in other embodiments, due to the reduced thickness of the sidewalls 254, the sidewalls 254 may resiliently return to their original shape, so that after the bending force is removed the shape of the flex apertures 234 when the bending ends, may return to the original linear shape.

The flex apertures 234 may be defined by sidewalls 254 within the rigid material 230. That is, the flex apertures 234 may be defined by the material surrounding the portions of material removed by the cutting machine during operation 108 of the method 100 in FIG. 1. The sidewalls 254 may allow the size of the flex aperture 234 to vary in dimension as the flexible portion 204 bends. For example, the two apexes 250, 252 may extend away from each other to increase the size of the flex aperture 234 or may extend towards each other to decrease the size of the flex aperture 234. Similarly, the two ends 246, 248 may be compressed towards each other or extend away from each other to vary the size of the flex aperture 234.

Figure 4C:
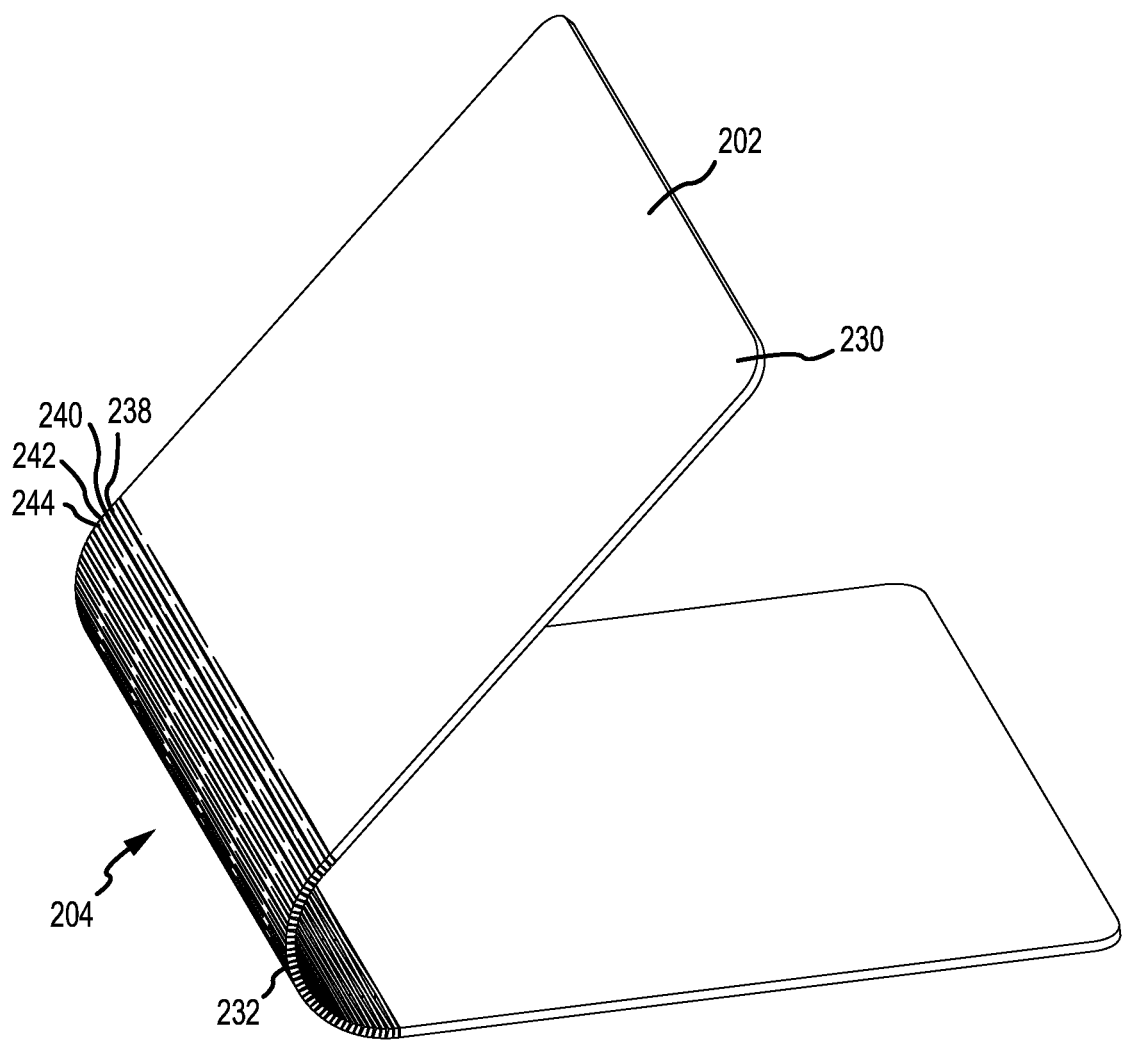
FIG. 4C is a simplified side perspective view of the enclosure of FIG. 2A including the geometric pattern of FIG. 3B with a top portion partially angled with respect to a bottom portion.
Figure 4D:
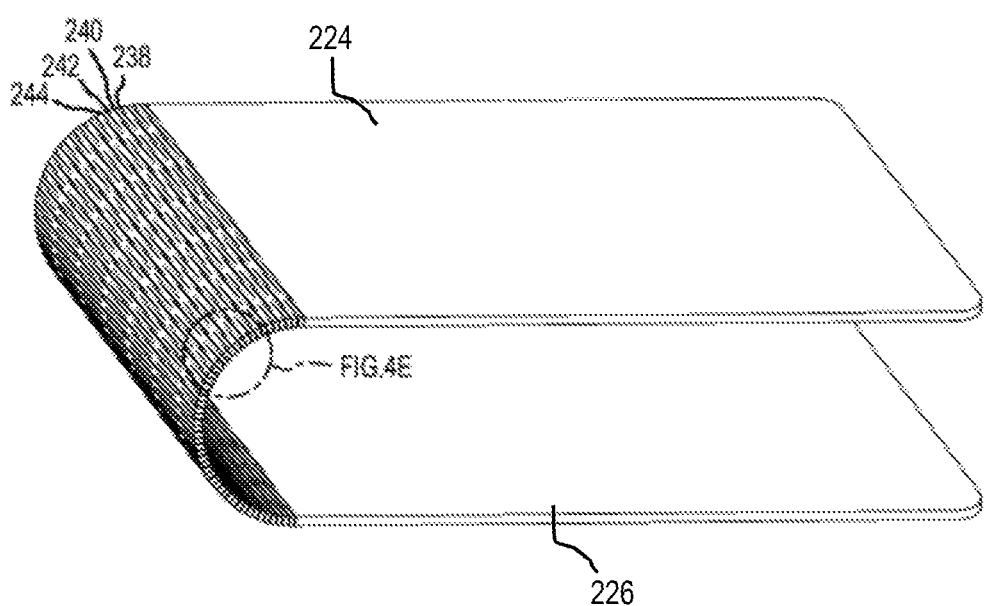
FIG. 4D is a simplified side perspective view of the enclosure of FIG. 2A including the geometric pattern of FIG. 3B with the top portion positioned substantially parallel to the bottom portion.

As briefly discussed above, in some embodiments, the shape of the flex apertures 234 may change along a depth or thickness of the rigid material 230. For example, on a first side 260 of the material 230, the flex apertures 234 may have a first size and/or shape and on a second side 262 of the material 230 the flex apertures 234 may have a second size and/or shape. This may be possible as the sidewalls 254 may vary in size along a thickness of the material. FIG. 4C is a side perspective view of the rigid material 230 being partially bent. FIG. 4D is a side perspective view of the rigid material 230 being more fully bent. As shown best in FIG. 4E, a first side 260 of the flex aperture 234 may have a smaller diameter and a second side 262 of the flex aperture 234 may have a diameter that is larger than the diameter on the first side 260 of the material 230. In this manner, the sidewalls 254 may form a triangular or frustum shape in profile.

This may also allow the geometric pattern to be varied between the first side of the material 260 and the second side 262 of the material. In other words, the first side 260 may include a first geometric pattern and the second side may include a second geometric pattern, one or both patterns may also be selected not only for angulation and bend radius, but also based on aesthetics. As one example, the first side geometric pattern may be selected based on its bending properties and the second side geometric pattern may be selected based on its aesthetic properties. However, in other embodiments, the geometric pattern on both sides of the material may be selected to be substantially identical.

The triangular shape of the sidewalls 254 (in profile) may help to prevent the sidewalls 254 of adjacent rows 238, 240 from encountering each other as the rigid material 230 is folded or otherwise bent. Further, the triangular shape of the sidewalls 254 may allow the flex apertures 234 to be more flexible on the inner surface 262 of the material 230 than on the outer surface 260 as the sidewalls 254 may be thicker in width towards the outer surface 260. The angular orientation of the sidewalls 254 may also act as a "stop" to prevent, reduce, or resist bending in a particular direction. This may help to protect internal components of the electronic device 200 from damage. For example, as the rigid material 230 may be used to form the enclosure 202, the angular orientation of the sidewalls 254 may prevent bending past a predetermined angle so that enclosure 202 does not "over bend" and potentially damage internal components from damage. Additionally, the angle of the sidewalls 254 may prevent or substantially resist bending in a particular direction. Further, by varying the thickness or size of the sidewalls 254, the flexible portion may become more or less rigid.

The shape of the sidewalls 254 may allow the flex apertures 234 to have an increased expansion during bending in the middle of each aperture 234, which may simultaneously minimize stresses on the sidewalls 254 surrounding the apertures 234. This allows the flexible portion 204 to bend without breaking or cracking the rigid material 230, including the sidewalls 254 surrounding each of the flex apertures 234.

Figure 4E:
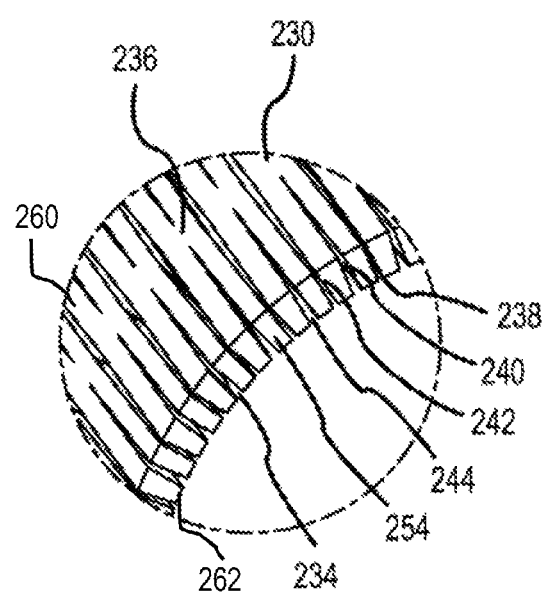
FIG. 4E is an enlarged side perspective view of the enclosure of FIG. 4D.

With reference to FIGS. 4D and 4E, due to the geometric pattern 232, the flexible portion 204 may bend along one or more axes, although the flexible portion 204 may be an integral portion of the rigid material 230. In FIGS. 4D and 4E, the top 224 is shown folded over the bottom 226. To cause the top 224 to be forced towards the bottom 226, a force may be applied to the top 224 compressing it towards the bottom 226 and the flex apertures 234 surrounding a rotation axis A may vary in size. Some of the flex apertures 234 may expand whereas others may decrease. Additionally, the sidewalls 254 surrounding the rotation axis A may be compressed towards one another. This is possible as a thickness of the sidewalls 254 may be decreased on the inner side 262 of the rigid material 230 (due to the shape of the flex apertures 234), which provides additional flexibility to the rigid material 230 and specifically the sidewall 254. The rotation axis A may be varied depending on the position of the compression force acting on the top 224.

As shown in FIG. 4D, in a second position of the enclosure 202, the top 224 may be positioned substantially parallel to the bottom 226, and depending on the thickness of the top 224 and/or bottom 226, the top 224 and bottom 226 may be positioned in contact with one another. In some embodiments, the flexible portion 204 may have a spring force, such that as the flex apertures 234 vary in shape to accommodate the bending forces of the top 224 and/or bottom 226, a spring force may accumulate. In these embodiments, depending on the weight of the top 224 (and other components operably connected thereto), when the bending force is released, the flexible portion 204 may return to an open or first position. However, in other embodiments, the weight of the top 224, the spring force of the flexible portion 204, or the weight of any components operably connected to the top 224 may allow the top 224 to remain in position until adjusted by a user or the like. For instance, after the top 224 has been positioned in the closed position, it may remain substantially in position, at least partially parallel to the bottom 226. In yet other embodiments, the geometric pattern 232 may be varied so that the flex apertures 234 may be configured to maintain the enclosure 202 in a predetermined position. For example, the geometric pattern 232 may be configured so that the sidewalls 254 may be substantially rigid or may deform slightly so that after the bending force is removed, the rigid material 230 may remain in the bent position. For example, certain portions of the geometric pattern 232 may have different shapes, sizes, or other characteristics in order to allow the enclosure 202 to remain in a partially bent or fully bent configuration when the bending force is removed.

Figure 5A:
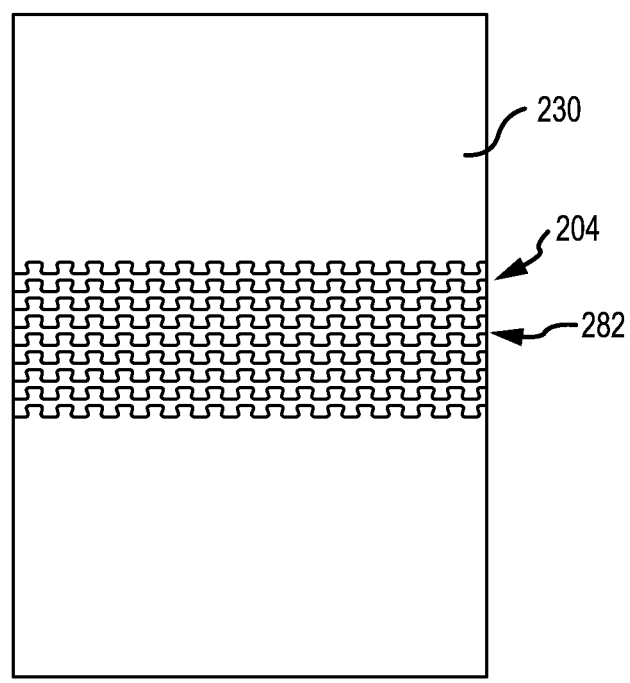
FIG. 5A is a top plan view of the rigid material including a second embodiment of a geometric pattern forming the flexible portion.
Figure 5B:
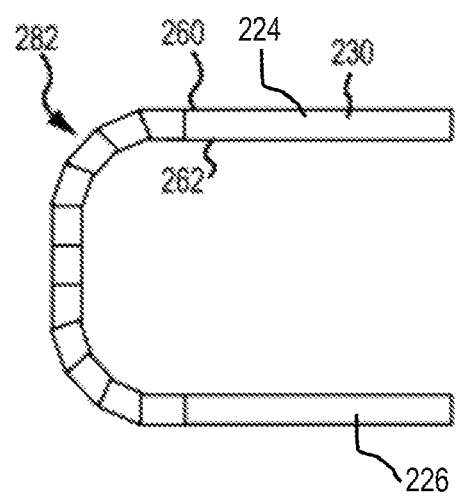
FIG. 5B is a simplified side perspective view of the enclosure of FIG. 2A including the geometric pattern of FIG. 5A with the top portion positioned substantially parallel to the bottom portion.
Figure 5C:
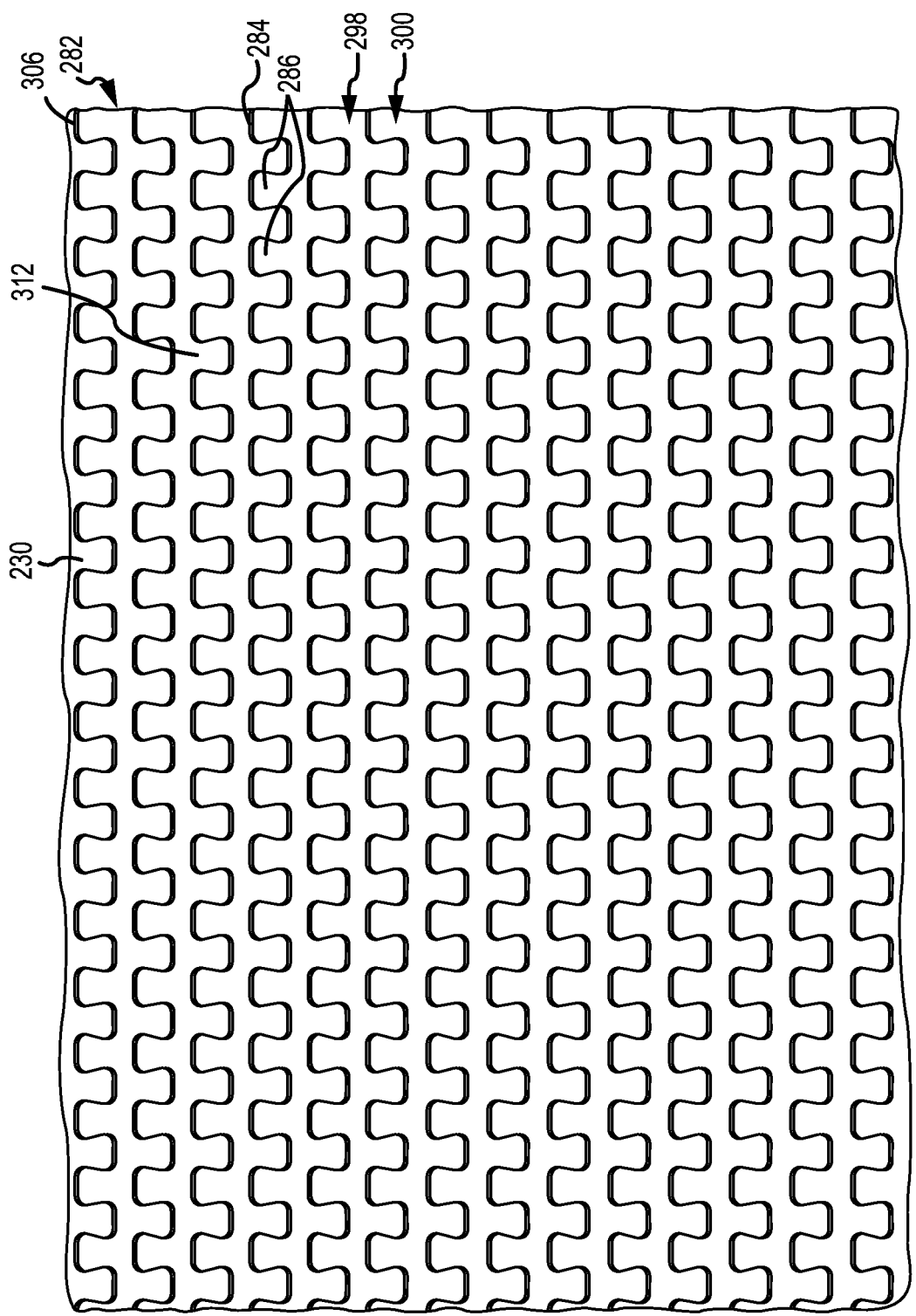
FIG. 5C is an enlarged top plan view of the geometric pattern of FIG. 5A.
Figure 5D:
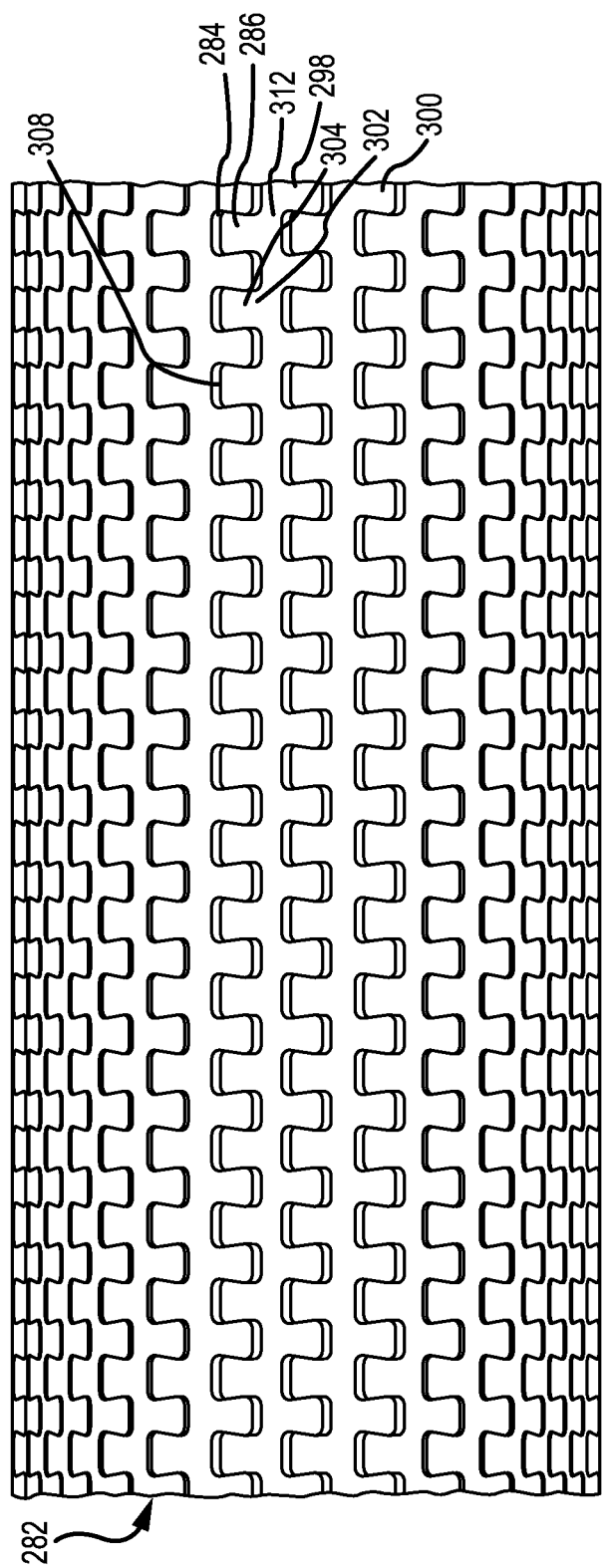
FIG. 5D is an enlarged side elevation view of the geometric pattern of FIG. 5A with the enclosure in the position illustrated in FIG. 5B.
Figure 5E:
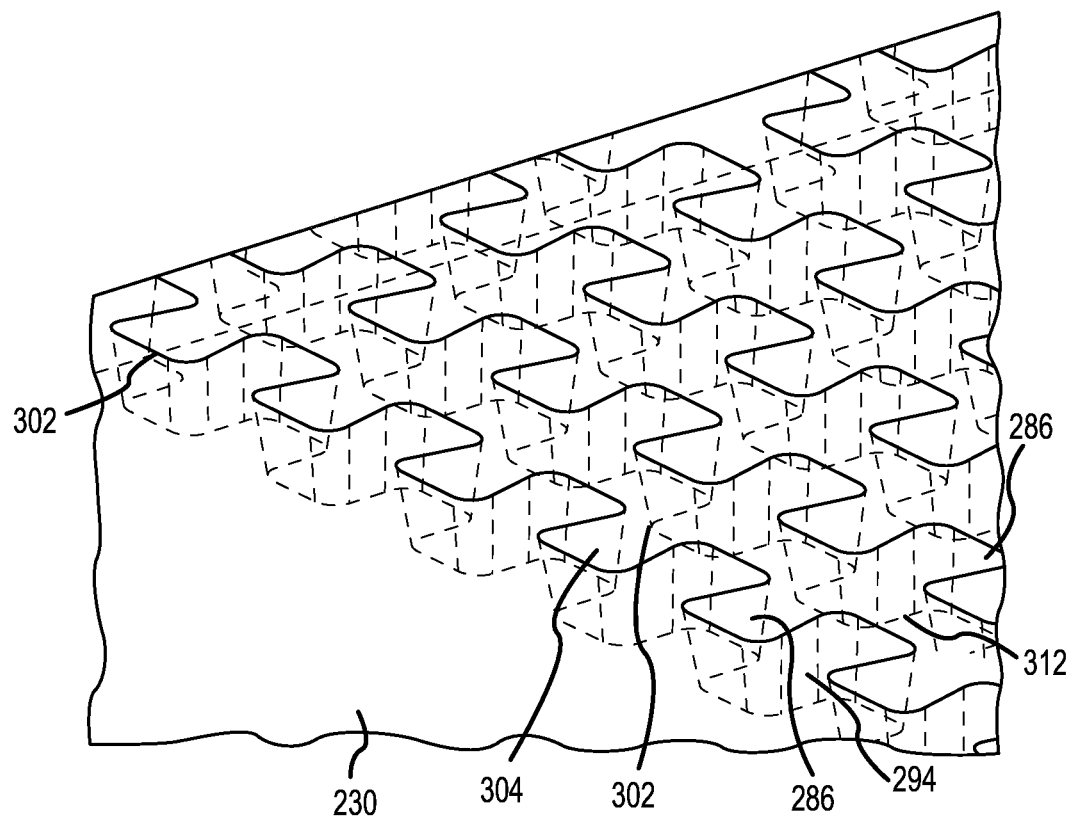
FIG. 5E is an enlarged top perspective view of the geometric pattern of FIG. 5A.

The geometric pattern 232 may be varied to alter one or more characteristics, such as the maximum bend angle or direction, of the flexible portion 204. FIG. 5A is a top plan view of the rigid material 230 including another embodiment of the geometric pattern 282. FIG. 5B is a side elevation view of the rigid material 230 including the geometric pattern 282 in a bent position. FIG. 5C is an enlarged top elevation view of flexible portion 204 of FIG. 5A. FIG. 5D is an enlarged view of a row of the geometric pattern removed from the rigid material 230. FIG. 5E is an enlarged view of the geometric pattern 282 in FIG. 5B. The geometric pattern 282 in this embodiment may include one or more interlocking features 286 separated from one another by flex apertures 284. Each of the interlocking features 286 may move relative to adjacent interlocking features 286 due to the flex apertures 284. Thus, in these embodiments, the flex apertures 284 may not stretch or expand due to the bending force as in the FIG. 4A embodiment, but rather may be increased or decreased due to the relative movement of the interlocking features 286 with respect to each other.

The interlocking features 286 may be shaped in a number of different manners, which may vary the bending available for the flexible portion 204. With reference to FIG. 5D, in some embodiments, the interlocking features 286 may include a narrow neck 302 extending from an edge of the rigid material 230 or for interlocking features 286 within an inner portion of the geometric pattern 282, a strip 312 of material. The neck 302 may expand outwards forming a head 304. The neck 302 and the head 304 may form an inverted frustum, with the head 304 extending away from the edge 306 of the rigid material 230 or an edge of the strip 312.

Adjacent interlocking features 286 extending from the same edge 306 or strip 312 may be substantially similar. As the flex apertures 284 are defined by the sidewalls of the interlocking features 286, the perimeter of the flex apertures 284 may generally trace the perimeter of the interlocking features 286. As such, the flex apertures 284 may also be generally frustum shaped. However, the flex apertures 284 may be aligned oppositely to the interlocking features 286 (for a single row 298, 300) such that the head or wide portion 308 of the flex aperture 284 may extend into the strip 312 of material, whereas the head 304 of the interlocking features 286 may extend away from the strip 312. Further, the flex apertures 284 may be cut between rows to define the interlocking features 286, and as such, the interlocking features 286 of vertically adjacent rows may be received in the flex apertures 284 of the adjacent row and the flex apertures 284 may separate rows of interlocking features 286 from each other. The width of the flex apertures 284 may be selected based on a desired bend radius of the material. For example, the finer the width of the flex apertures 284, the smaller the bend radius.

The flex apertures may be integrally formed apertures that extend along an entire dimension of the rigid material, e.g., along the entire length or width. The flex apertures may form curved or undulating lines that separate two portions of the material from each other by a spacing gap. Due to the curved nature of the flex apertures, the interlocking features may be locked together, although the material may be disconnected by the flex apertures. The spacing gap or the size of the flex apertures may be varied between a first side of the material and a second side of the material.

With continued reference to FIGS. 5A and 5C, there may be one or more rows 298, 300 of interlocking features 286 defined within the rigid material 230. The number of rows 298, 300 may depend on the desired amount of bending or flexibility for the rigid material 230. The more rows 298, 300 within the geometric pattern 282, the more portions of the rigid material 230 may be flexible. In some embodiments, the rows 298, 300 may define strips 312 or lengths of rigid material 230 having interlocking features 286 extending from either side. For example, a row 298, 300 may be positioned between two other rows, and thus may include interlocking features 286 extending from opposite sides thereof in order to interlock with the adjacent rows. As another example, the rigid material may have a plurality of rows that extend along its entire length or width, so that the material may be flexible along an entire dimension.

With reference to FIG. 5E, the interlocking features 286 may include sidewalls 294 forming an outer perimeter of each respective interlocking feature 286. The sidewalls 294 may extend between the inner surface 262 and the outer surface 260. In some embodiments, the sidewalls 294 may vary in thickness between the inner surface 262 and the outer surface 260. In these embodiments, the sidewalls 294 may angle upwards from one surface 260, 262 towards the other, such that the angle of the sidewalls 294 with respect to a plane of the outer surface 260 may vary along the depth or thickness of the sidewall 294. Additionally, the sidewalls 294 may be varied in angular orientation from each other (with respect to the plane of the outer surface 260). For example, as shown in FIG. 5F, the first sidewall 316 may extend into the flex aperture 284 and a second sidewall 314 may extend away from the flex aperture 284.

Figure 5F:
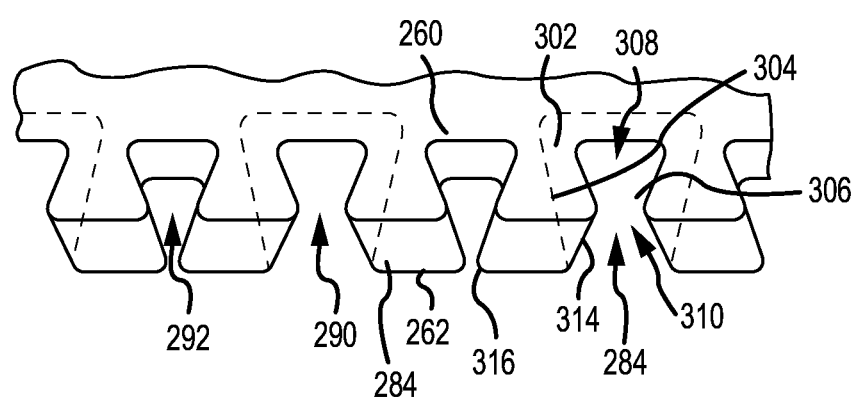
FIG. 5F is a top perspective view of a row of the geometric pattern of FIG. 5A.

With reference to FIGS. 5F and 5E, in some instances, a first sidewall 316 may form a first side of the interlocking feature 286 and the second sidewall 314 may form a second side of the interlocking feature 286. Accordingly, the first side of the interlocking feature 286 may be angled inwards from the outer surface 260 to the inner surface 262 and the second side of the interlocking feature 286 may be angled outwards from the outer surface 260 to the inner surface 262. In some embodiments, laterally adjacent interlocking features 286 may have opposite sides that extend inwards or outwards. For example, a first interlocking feature 286 may have a right side extending inwards and a left side extending outwards and a second interlocking feature 286 adjacent to the first interlocking feature 286 may have a right side extending outwards and a left side extending inwards.

The angled sidewalls may allow the base or rigid material to be shaped in a number of different ways. For example, the angled walls may allow the rigid material to have a substantially planar shape and as the material bends (due to the flex apertures), the flex apertures may remain interconnected through the angled walls. Additionally, the pitch of the sidewalls may be varied to vary the bending radius, and the pitch may be variable in the material, such that certain portions of the material may have a first bending radius and other portions of the material may have a second bending radius.

With continued reference to FIG. 5F, as viewed from the top plan view, along the outer surface 260 the interlocking features 286 may appear to be substantially the same dimensions. However, along the inner surface 262, the interlocking features 286 may have varying sidewall 294 thicknesses. For example, a first flex aperture 290 may have a decreased diameter along the inner surface 262 as compared with a second laterally adjacent flex aperture 292. The varying thicknesses, may allow laterally adjacent interlocking features 286 to have differing angles of movement. A first interlocking feature 286 received within the first flex aperture 290 may be able to extend downwards towards the inner surface 262, whereas a second interlocking feature 286 received within the second flex aperture 292 may not be able to extend the same amount inwards towards the inner surface 262 due to the decreased size of the second flex aperture 292. Conversely, the first interlocking feature received within the first flex aperture 290 may not be able to extend as far upwards towards the outer surface 260 as the second interlocking feature received within the second flex aperture 292.

In embodiments where the interlocking features 286 have varying angled sidewalls 294, the dimensions of the flex apertures 284 defined by laterally adjacent interlocking features 286 may be different from each other. That is, a first flex aperture 290 may be larger (when viewed from the inner surface 262) than a second flex aperture 292 defined along the same row 298 and laterally adjacent to the first flex aperture 290. The varying dimensions of the flex apertures 284 due the varying angular changes of the sidewalls 294, may function to interlock the interlocking features 286 from adjacent rows together, while still allowing the interlocking features 286 to move relative to each other.

With reference to FIGS. 5B and 5E, bending the rigid material 230 will now be discussed in more detail. As a force is applied to one or both of the top 224 and bottom 226, the rigid material 230 may bend along an axis A positioned within the flexible portion 204. The force may cause one or more rows 298, 300 of the interlocking features 286 to move relative to each other. For example, as shown in FIG. 5E, select interlocking features 286 may extend slightly outwards away from a plane of the material 230. However, due to the alternating sidewall 314, 316 thicknesses and the flex apertures 284 dimensions, the interlocking features 286 may remain substantially secured together. The freedom of movement in at least one direction may provide sufficient strain relief for the rigid material 230 to allow it to bend along the axis A without cracking or breaking.

It should be noted that other rotation axes are possible other than axis A. The location of the rotation axis A may depend on the orientation of the geometric pattern 282 as well as the location of the bending force. In some embodiments, the rotation axis A may be positioned substantially anywhere along the flexible portion 204. In other embodiments, the rotation axis may be fixed in a single position and may form a living hinge in that the material 230 such that the material 230 may only be able to rotate along that single axis. The rotation axis may be defined by the degree of movement between adjacent interlocking features. Accordingly, by restricting or reducing the movement of certain features relative to others, the flexible portion 204 may be configured to only rotate or bend along an axis that may be aligned with other features that may have increased movement relative to other interlocking features.

Figure 6A:
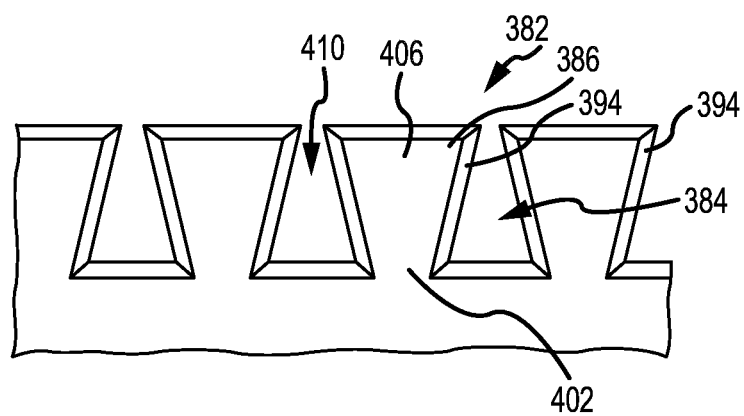
FIG. 6A is a top perspective view of a row of a third embodiment of the geometric pattern forming the flexible portion.

In another embodiment, sidewalls of the interlocking features may be similarly angled. FIG. 6A is a top plan view of another embodiment of the interlocking features for the geometric pattern 382. In this embodiment, interlocking features 386 may be movably secured together by a neck portion 410 of the flex apertures 384. That is, a head portion 406 of the interlocking features 386 may substantially touch laterally adjacent head portions 406 so that the neck portion 410 may be relatively narrow.

Figure 6B:
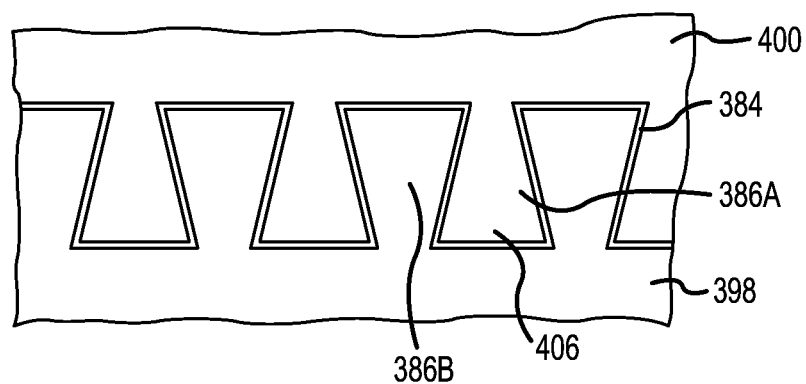
FIG. 6B is a top perspective view of two rows of the geometric pattern of FIG. 6A.
Figure 6C:
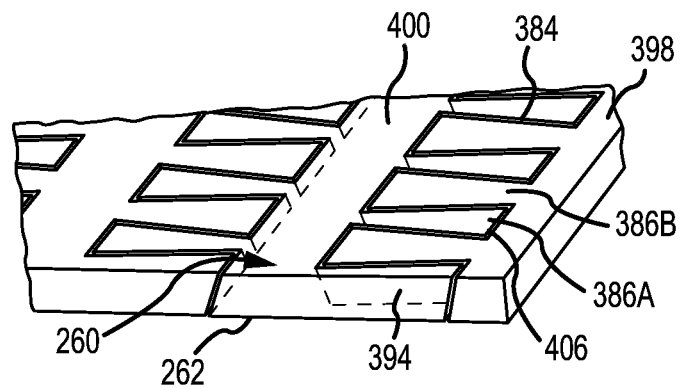
FIG. 6C is a side perspective view of a portion of the geometric pattern of FIG. 6A.

In these embodiments, the head portions 406 of interlocking rows may be pinched by the head portions 402 of the other row of interlocking features 386. FIG. 6B is an enlarged view of a first row 398 interlocked with a second row 400. FIG. 6C is an enlarged perspective view of the geometric pattern 382. As the head portion 406 may be wider than the neck portion 410 of the flex apertures 384, first row 398 may be substantially prevented from becoming disconnected from the second row 400. However, the first row 398 may move in a first plane relative to the second row 400, until the sidewalls of the first interlocking feature 386A encounter the sidewalls of the second interlocking features 386B defining the flex aperture 384. For example, the sidewalls 394 may be angled as they extend from the outer surface 260 to the inner surface 262, so that the upper portions of the sidewalls 394 may be narrower than the bottom portions of the sidewalls 394. This may allow the top portions of the sidewalls 394 to be movable relative to adjacent interlocking features 386, while the bottom portions of the sidewalls 394 may be secured in place. Additionally, in some embodiments, the sidewalls of the interlocking features 386 for the first row 398 may be oppositely angled from the sidewall of the interlocking features 386 for the second row 400.

Further, the first interlocking feature 386A may also move in a second plane, e.g., in the Y direction away from the plane of the rigid material 230. In some embodiments, a portion of the first interlocking feature 386A may be pinched within the neck portion 410 of the flex aperture 384 (due to the head portions 406 of adjacent interlocking features) such that the head portion 406 of the first interlocking feature 386A may extend upwards or downwards relative to the second row 400 while remaining secured thereto.

Figure 7A:
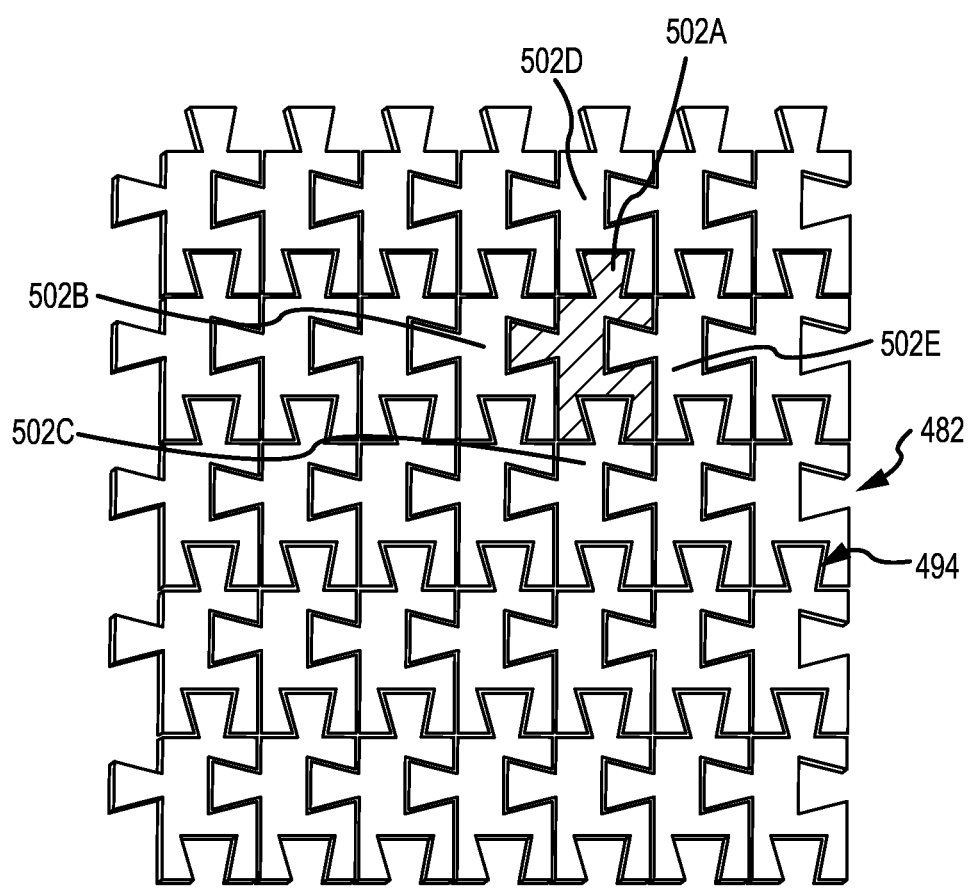
FIG. 7A is a top plan view of a fourth embodiment of the geometric pattern forming the flexible portion.
Figure 7B:
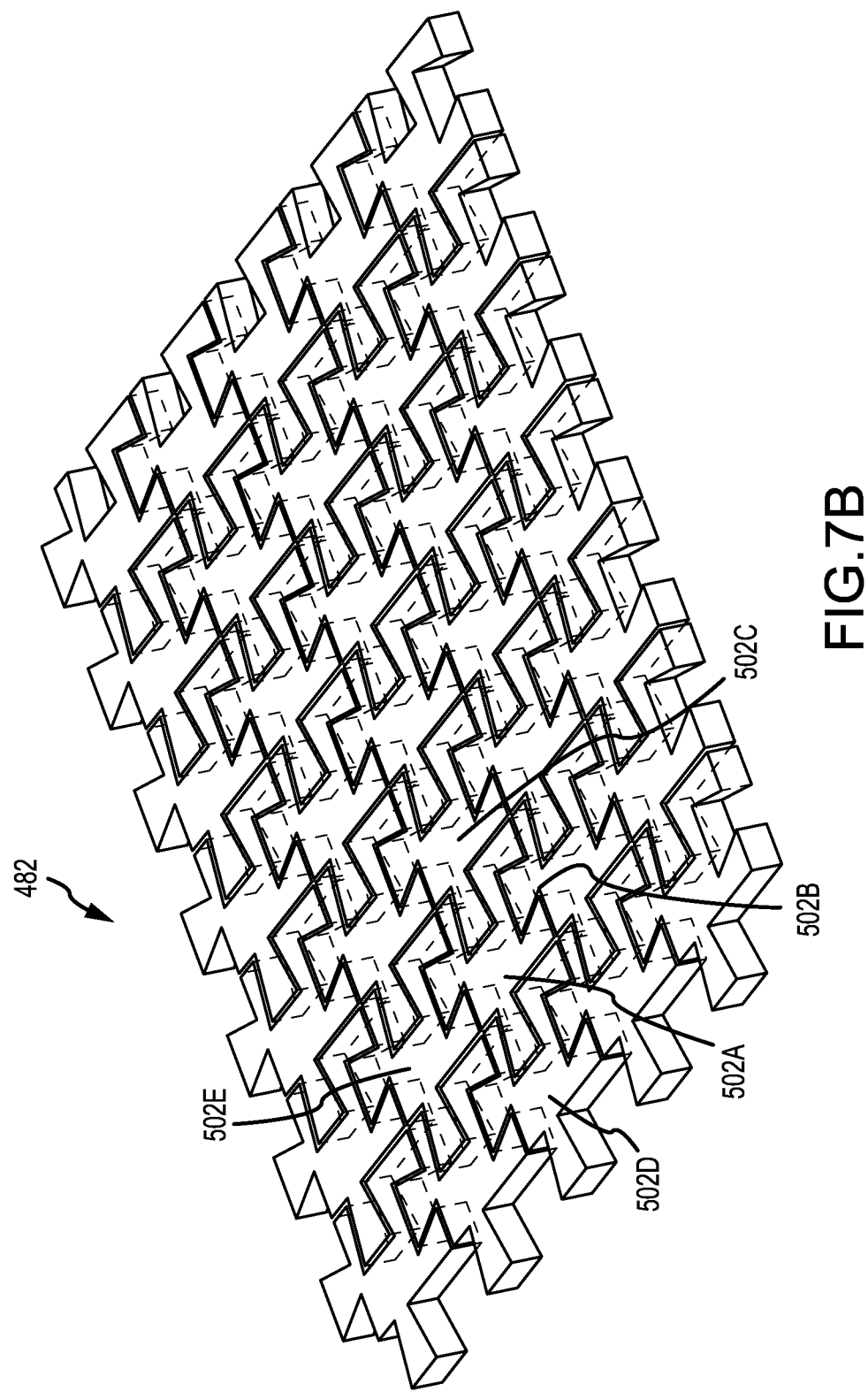
FIG. 7B is a top perspective view of the geometric pattern of FIG. 7A.
Figure 7C:
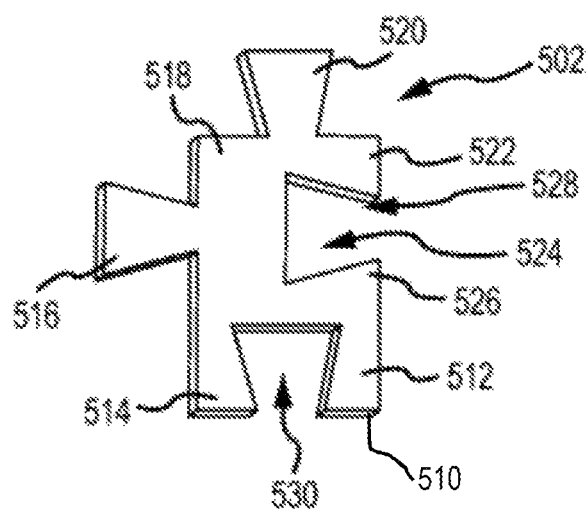
FIG. 7C is a top plan view of an interlocking feature removed from the geometric pattern of FIG. 7A.

In other embodiments, the interlocking features may bend in multiple directions and orientations. FIG. 7A is a bottom fragmentary perspective view of another embodiment of the geometric pattern 482 including interlocking features 502 that may bend in two directions. FIG. 7B is a top perspective view of the geometric pattern 482. FIG. 7C is a top plan view of an interlocking feature 502A removed from the geometric pattern 482. In this embodiment, rows 498, 500 may be formed of a series of separately interlocked features 502A, 502B, 502C, 502D, 502E. In this manner, due to the flex apertures 484 separating portions of the material 230, the interlocking features 502 may be discrete elements movable connected together to form rows 498, 500. That is, unlike the rows 298, 300 and rows 398, 400 which may include a main portion with adjacent interlocking features extending therefrom, the rows 498, 500 may be formed of separate interlocking features 502 movably connected together.

With reference to FIG. 7C, each interlocking feature 502A-502E may include a main body 510 with one more locking members extending therefrom. For example, the interlocking features 502A-502E may include two legs 512, 514 extending from a first end of the main body 510, a head 520 extending from a second end of the main body 510 opposite the legs 512, 514, and a back portion 516 extending from a first side of the main body 510. Also, a second side of the main body 510 may define a receiving aperture 524. The receiving aperture 524 may include a neck portion 528 defined by two pinching members 522, 526 that may extend into the receiving aperture 524 at the edge of the second side of the main body 510. A head receiving aperture 530 may be defined between the two legs 512, 514 of the interlocking feature 502.

In some embodiments, the edges of the rigid material 230 surrounding the flexible portion 204 may define portions of the interlocking features 502A-502E. In these embodiments, these portions of interlocking features 502 may operably connect to one or more other interlocking features 502A-502E. Accordingly, some portions of the geometric pattern 482 may include non-discrete interlocking features.

With reference to FIGS. 7A and 7C, the interlocking features 502A-502E may be operably connected to one or more other interlocking features 502A-502E. For example, within middle portions of the geometric pattern 482, a first interlocking feature 502A may be operably connected to four other interlocking features 502B, 502C, 502D, and 502E. For example, the head 520 of the interlocking feature 502C may be received within the head receiving aperture 530 in the first interlocking feature 502A, where the back portion 516 of the first interlocking feature 502A may be received within the receiving aperture 524 of the second interlocking feature 502B, the head 520 of the first interlocking feature 502A may be received within the head receiving aperture 530 within the fourth interlocking feature 502D, and the back portion 516 of the fifth interlocking feature 502E may be received within the receiving aperture 524 of the first interlocking feature 502A. Thus, the first interlocking feature 502A may be operably connected to each of the other interlocking features 502B, 502C, 502D, 502E.

It should be noted that the bending radius of the rigid material or forming material may be modified by varying one or more parameters of the geometric pattern. A few parameters include, width of the flex aperture, angulation of the sidewalls boarding the flex apertures or grooves, pitch of the cuts, and thickness of the rigid material.

Figure 8A:
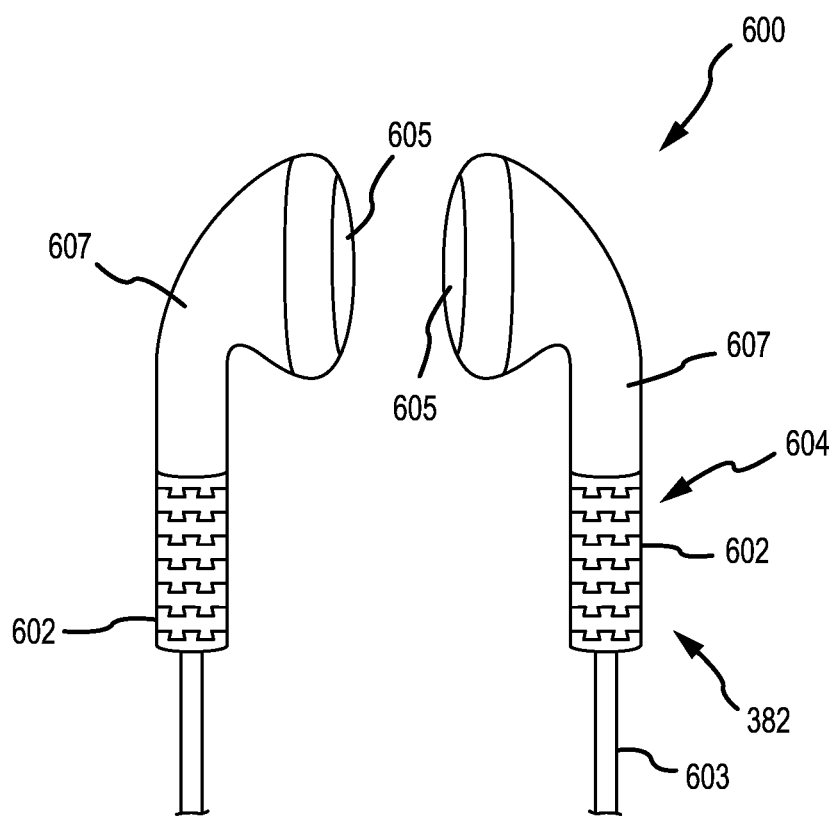
FIG. 8A is a perspective view of a pair of headphones including an enclosure with the geometric pattern of FIG. 6A defining the flexible portion.
Figure 8B:
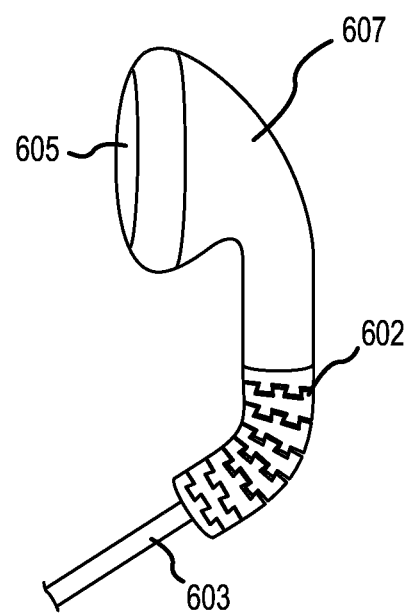
FIG. 8B is a side perspective view of one of the headphones bending by flexing along the flexible portion of the enclosure.

As briefly discussed above, the rigid material 230 may be used to form the enclosure 202 for the electronic device 200. FIG. 8A is a perspective view of another embodiment of an electronic device 600. FIG. 8B is a perspective view of the electronic device in a flexed position. In FIGS. 8A and 8B, the electronic device 600 is an audio output mechanism such as headphones operably and electronically connected to a communication cable 603. The communication cable 603 may be operably connected to a speaker 605 by the enclosure 602.

The enclosure 602 may be formed of the rigid material 230 and may optionally be operably connected to a second portion of top of the enclosure 607. In other embodiments, the enclosure 602 may be a substantially unitary structure, with the flexible portion 604 being located near the connection to the cable 603. The enclosure 602, as shown in FIGS. 8A and 8B, may include the geometric pattern 382 of FIGS. 6A-6C along the length of the flexible portion 604. This may allow the enclosure 602 to bend, while still maintaining a rigid connection to the speaker 605. For example, the communication cable 603 may be flexible and may move relative to the enclosure 602, which in conventional rigid enclosures may cause the enclosure to wear and/or crack over time. As the enclosure 602 may bend and flex as the communication cable 603 may move. Thus, the enclosure 602 may be substantially prevented from breaking or cracking due to the movement of the communication cable 603. Additionally, the flexibility of the enclosure 602 may increase the bending radius of the communication cable 603 at the connection location. This may provide a strain relief for the cable 603, which may help to prevent internal wires or the cable 603 itself from breaking due to a bending force. It should be noted that although the enclosure 602 is positioned at the end of the cable closest to the speakers, it should be noted that the enclosure may be positioned at other locations where strain relief may be desired. For example, the flexile portion of the enclosure may be positioned at a second end of the cable that may connect the cable to an electronic device (e.g., through an audio port or the like). In this example, the flexibility of the enclosure may allow the cable to remain connected to the port, but may also flex or bend.

Figure 9A:
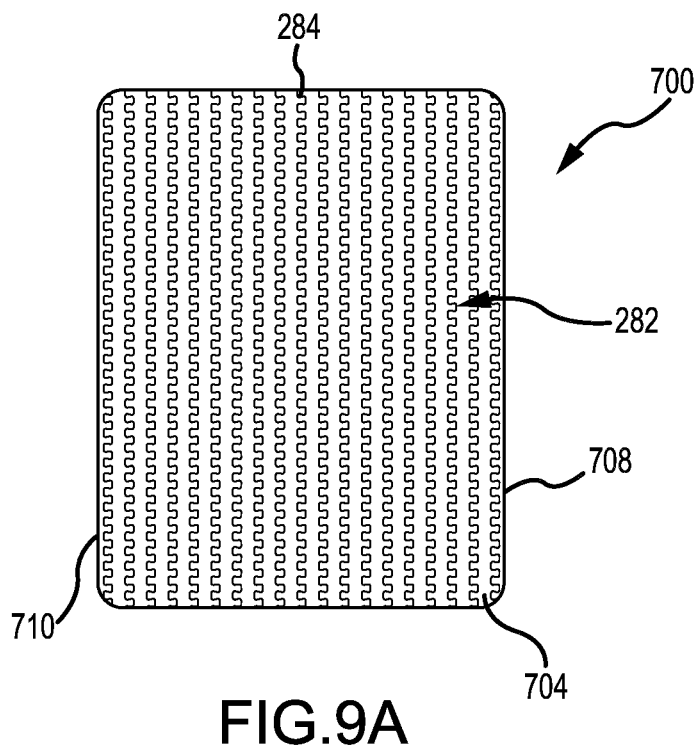
FIG. 9A is a top plan view of a cover for an electronic device including a geometric pattern defined therein.
Figure 9B:
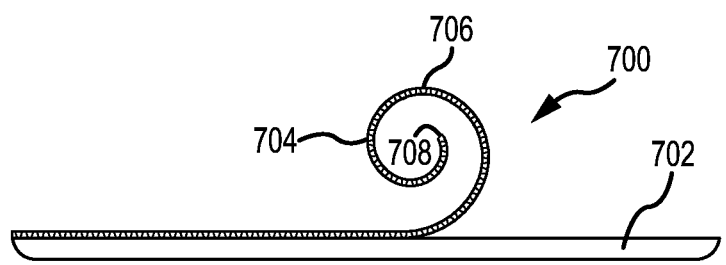
FIG. 9B is a side elevation view of the cover and the electronic device of FIG. 9A with the cover partially retracted.
Figure 9C:
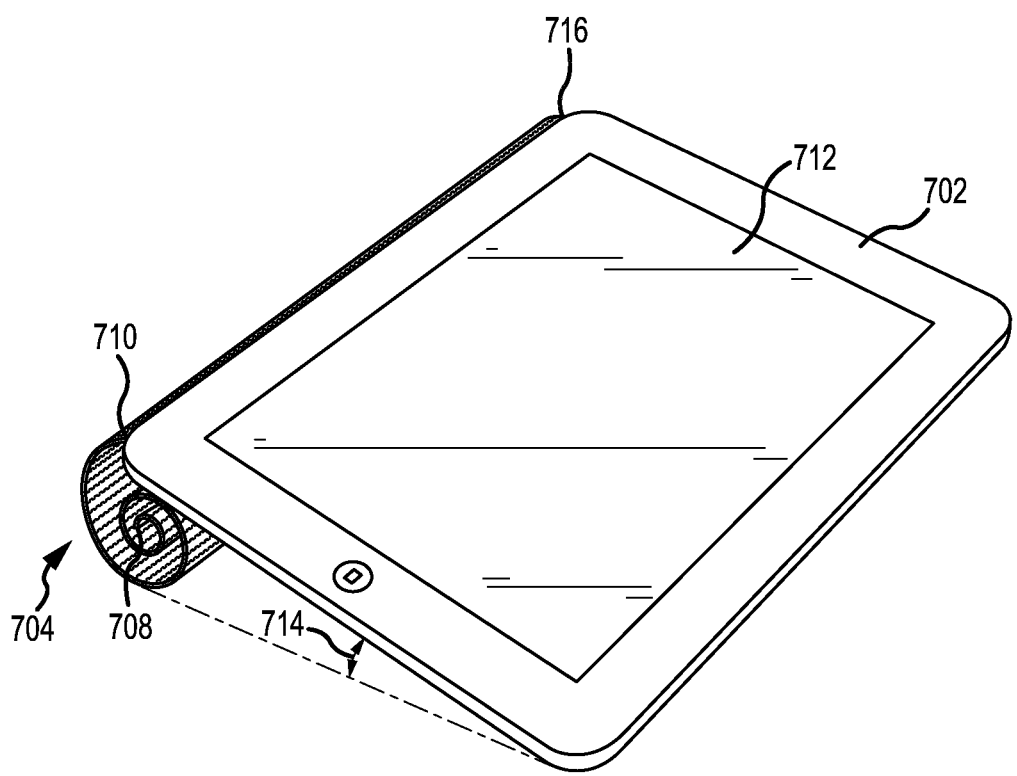
FIG. 9C is a top perspective view of the cover and the electronic device of FIG. 9A with the cover fully retracted and acting as a support or stand for the electronic device.

Using the techniques described herein, a cover, band, or the like may be formed using a rigid or substantially rigid material. FIG. 9A is a top plan view of a cover for an electronic device including a geometric pattern defined therein. FIG. 9B is a side elevation view of the cover and the electronic device of FIG. 9A with the cover partially retracted. FIG. 9C is a top perspective view of the cover and the electronic device of FIG. 9A with the cover fully retracted and acting as a support or stand for the electronic device. With reference to FIGS. 9A-9C, an electronic device 700 includes a cover 704 having the geometric pattern 282 defined therein.

As described above with respect to FIG. 5C, the geometric pattern 282 may include a plurality of flex apertures 284 and interlocking features that allow the rigid material forming the cover 704 to bend or flex. In the embodiment illustrated in FIGS. 9A-9C, the angulation of the features defined in the cover 704 allows the cover 704 to be rolled around itself. In some embodiments, the geometric pattern 282 may be substantially the same as the pattern shown in FIG. 5C. However, in the example illustrated in FIG. 9A, the flex apertures 284 may be defined in vertical columns that extend along a height of the computing device 702. This configuration may allow the entire cover 704 to flex about an axis parallel to the length axis of the computing device 702. In other words, the cover 704 may roll or flex in a direction substantially parallel to the direction of the columns of the flex apertures 284. However, it should be noted that the geometric pattern for the cover may be selected based on a desired flex direction, bend radius, and the like. Thus, the geometric pattern and the bending direction illustrated in FIGS. 9A-9C are illustrative only.

As shown in FIG. 9A, the cover 704 may lie substantially flat against the top surface of the computing device 702 and may protect a display 712 or other portions of the computing device 702. With reference to FIG. 9A, a first end 708 of the cover 704 may be rolled towards a second end 710 forming a rolled portion 706. As the cover 704 is rolled upon itself, the display 712 or other portions of the computing device 702 may be exposed.

In some embodiments, with reference to FIG. 9C, the cover 704 may be configured to roll and wrap around an edge of the computing device 702 to act as a support stand. For example, a portion of the computing device 702 may rest on the rolled portion 706 of the cover 704, which may allow the computing device 702 to be supported above a surface at a support angle 714. The support angle 714 may generally correspond to the outermost radius of the bend portion 706. In other words, the radial bend of the cover 704 may be defined by geometric pattern, the angulation of the sidewalls defining the flex apertures and the features.

With continued reference to FIG. 9C, the second end 710 of the cover 704 may be anchored to an edge 716 of the computing device 702 and may rotate about the edge 716, allowing the rolled portion 706 of the cover 704 to rotate around the edge 716 to a backside of the computing device 702.

CONCLUSION

The foregoing description has broad application. For example, while examples disclosed herein may focus on enclosures, it should be appreciated that the concepts disclosed herein may equally apply to substantially any other components constructed out of rigid materials, such as, but not limited to, garage doors, coverings for architectural openings (e.g., blinds or shades), bands for supporting an electronic device around a portion of a user, and so on. Moreover, although the discussion is made with respect to rigid materials, the methods and techniques may be applied to a variety of materials where an increased flexibility or a flexible portion is desired. Accordingly, the discussion of any embodiment is meant only to be exemplary and is not intended to suggest that the scope of the disclosure, including the claims, is limited to these examples.

What is claimed is:

1. An electronic device comprising:
   an electronic component; and
   an enclosure that protects the electronic component, the enclosure comprising:
      an enclosure top;
      an enclosure bottom; and
      an enclosure hinge that allows the enclosure top and the enclosure bottom to move relative to each other about a bend axis, wherein:
         the enclosure top comprises a first portion of a single piece of material;
         the enclosure bottom comprises a second portion of the single piece of material;
         the enclosure hinge comprises a third portion of the single piece of material that extends between the first portion of the single piece of material and the second portion of the single piece of material;
         the third portion of the single piece of material comprises a plurality of apertures extending from a first surface of the third portion to a second surface of the third portion;
         an aperture of the plurality of apertures varies in dimension as the enclosure top and the enclosure bottom move relative to each other about the bend axis;
         a sidewall defines at least a portion of the aperture of the plurality of apertures and extends from a first end of the aperture at the first surface to a second end of the aperture at the second surface; and
         the sidewall forms a non-perpendicular angle with the first surface of the third portion of the single piece of material.

2. The electronic device of claim 1, wherein:
   the plurality of apertures comprises:
      a first row of apertures arranged in a first direction aligned with the bend axis;
      a second row of apertures arranged in the first direction; and
      a third row of apertures arranged in the first direction;
      the apertures of the third row of apertures are aligned with the apertures of the first row of apertures;
      the apertures of the second row of apertures are misaligned with the apertures of the first row of apertures; and
      the second row of apertures is positioned between the first row of apertures and the third row of apertures.

3. The electronic device of claim 2, wherein the apertures of the second row of apertures are also misaligned with the apertures of the third row of apertures.

4. The electronic device of claim 2, wherein each aperture of each one of the first, second, and third rows of apertures is diamond-shaped.

5. The electronic device of claim 2, wherein each aperture of each one of the first, second, and third rows of apertures varies in dimension as the enclosure top and the enclosure bottom move relative to each other about the bend axis.

6. The electronic device of claim 1, wherein the aperture of the plurality of apertures is diamond-shaped.

7. The electronic device of claim 6, wherein:
   the aperture of the plurality of apertures comprises two opposing and aligned apexes; and
   a distance between the apexes varies as the enclosure top and the enclosure bottom move relative to each other about the bend axis.

8. The electronic device of claim 7, wherein the distance between the apexes is substantially perpendicular to the bend axis.

9. The electronic device of claim 7, wherein:
   the aperture of the plurality of apertures further comprises two opposing and aligned ends;
   a distance between the ends varies as the enclosure top and the enclosure bottom move relative to each other about the bend axis; and
   the distance between the ends is substantially parallel to the bend axis.

10. The electronic device of claim 1, wherein the sidewall forms a non-perpendicular angle with the second surface of the third portion of the single piece of material.

11. The electronic device of claim 1, wherein the sidewall is configured to limit an amount of movement of the enclosure top and the enclosure bottom relative to each other about the bend axis.

12. The electronic device of claim 1, wherein:
   the opening in the first surface has a first shape;
   the opening in the second surface has a second shape; and
   the first shape is different than the second shape.

13. The electronic device of claim 1, wherein:
   the enclosure at least partially surrounds the electronic component; and
   the electronic component is one of:
      a keyboard;
      a track pad; or
      a display.

14. The electronic device of claim 1, wherein:
   the enclosure houses the electronic component; and
   the electronic component is one of:
      a processor; or
      a storage medium.

15. The electronic device of claim 1, wherein the enclosure is a laptop computer clamshell.

16. The electronic device of claim 1, wherein at least a portion of the first portion of the single piece of material defines at least a portion of a first wall of a space that holds at least a portion of the electronic component.

17. The electronic device of claim 1, wherein the single piece of material is a rigid material.

18. An enclosure housing an electronic component of an electronic device comprising:
- a first plurality of flex apertures defined within a rigid material along a first row; and
- a second plurality of flex apertures defined within the rigid material along a second row, wherein:
  - the second row is positioned below the first row;
  - the first plurality of flex apertures are misaligned with the second plurality of flex apertures such that a first end of each flex aperture of the first plurality of flex apertures is in a different vertical plane from a first end of each flex aperture of the second plurality of flex apertures;
  - when a bending force is applied to one of the first row and the second row, two opposing and aligned apexes of each aperture of each of the first plurality of flex apertures and the second plurality of flex apertures expand away from one another in a direction perpendicular to a bend axis, allowing the rigid material to bend about the bend axis;
  - the enclosure at least partially surrounds the electronic component of the electronic device when the enclosure is bent about the bend axis;
  - at least one flex aperture of at least one of the first plurality of flex apertures or the second plurality of flex apertures extends between an opening in a first surface of the rigid material and an opening in a second surface of the rigid material;
  - the opening in the first surface has a first shape;
  - the opening in the second surface has a second shape; and
  - the first shape is different than the second shape.

19. An electronic device comprising:
- an electronic component; and
- an enclosure that protects the electronic component, the enclosure comprising:
  - a first enclosure portion;
  - a second enclosure portion; and
  - a third enclosure portion that allows the first enclosure portion and the second enclosure portion to move relative to each other, wherein:
    - the first enclosure portion comprises a first portion of a single piece of material;
    - the second enclosure portion comprises a second portion of the single piece of material;
    - the third enclosure portion comprises a third portion of the single piece of material that extends between the first portion of the single piece of material and the second portion of the single piece of material;
    - the third portion of the single piece of material comprises an aperture that varies in dimension when the first enclosure portion and the second enclosure portion move relative to each other;
    - the aperture extends between an opening in a first surface of the third portion of the single piece of material and an opening in a second surface of the third portion of the single piece of material;
    - the opening in the first surface has a first shape;
    - the opening in the second surface has a second shape; and
    - the first shape is different than the second shape.

* * * * *